US008711442B2

(12) United States Patent
Kawano et al.

(10) Patent No.: US 8,711,442 B2
(45) Date of Patent: Apr. 29, 2014

(54) IMAGE READING APPARATUS

(75) Inventors: Hiroyuki Kawano, Tokyo (JP); Taku Matsuzawa, Tokyo (JP); Tatsuki Okamoto, Tokyo (JP); Tadashi Minobe, Tokyo (JP); Tatsuya Kunieda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 193 days.

(21) Appl. No.: 13/361,518

(22) Filed: Jan. 30, 2012

(65) Prior Publication Data

US 2013/0155472 A1 Jun. 20, 2013

(30) Foreign Application Priority Data

Dec. 20, 2011 (JP) ................................. 2011-277805

(51) Int. Cl.
*H04N 1/387* (2006.01)
*H04N 1/04* (2006.01)

(52) U.S. Cl.
USPC ............ 358/450; 358/474; 358/483; 347/244

(58) Field of Classification Search
None
See application file for complete search history.

(56) References Cited

U.S. PATENT DOCUMENTS

| 4,742,240 | A | 5/1988 | Yamanishi et al. |
| 5,187,358 | A | 2/1993 | Setani |
| 7,884,976 | B2 * | 2/2011 | Minobe et al. ................ 358/483 |
| 8,228,566 | B2 * | 7/2012 | Kawano et al. ............... 358/474 |
| 2008/0225108 | A1 * | 9/2008 | Koizumi et al. .............. 347/244 |
| 2009/0147321 | A1 | 6/2009 | Minobe et al. |
| 2010/0284045 | A1 * | 11/2010 | Kawano et al. ............... 358/474 |
| 2011/0038019 | A1 | 2/2011 | Kawano et al. |

FOREIGN PATENT DOCUMENTS

| EP | 2 259 566 A1 | 12/2010 |
| JP | 5-14600 | 1/1993 |
| JP | 8-204899 | 8/1996 |
| JP | 10-308852 | 11/1998 |
| JP | 11-8742 | 1/1999 |
| JP | 2005-37448 | 2/2005 |

(Continued)

OTHER PUBLICATIONS

German Office Action issued Nov. 5, 2012 in corresponding German Application No. 10 2012 100 726.8 (with an English Translation).

(Continued)

*Primary Examiner* — Firmin Backer
*Assistant Examiner* — Henok A Shiferaw
(74) *Attorney, Agent, or Firm* — Oblon, Spivak, McClelland, Maier & Neustadt, L.L.P.

(57) ABSTRACT

The object of the present invention is to provide an image reading apparatus having a large depth of field and being compact in size.

The image reading apparatus includes a light source, an imaging optics system, an image pickup device unit, a memory, and a processor. The imaging optics system has a plurality of cells each being an independent optics system arranged in a main scanning direction, and arranged in two rows in a sub-scanning direction. In each of the cells, a first reflective light-gathering optical element, a first plane mirror, an aperture, and a second reflective light-gathering optical element are arranged in this order from a document, and the aperture is arranged at the back focal point position of the first reflective light-gathering optical element to form a telecentric optics system at the side of the document.

17 Claims, 27 Drawing Sheets

(56) References Cited

FOREIGN PATENT DOCUMENTS

| | | |
|---|---|---|
| JP | 2006-259544 | 9/2006 |
| JP | 2009-246623 | 10/2009 |
| JP | 2010-141558 | 6/2010 |
| JP | 2010-206358 | 9/2010 |
| WO | WO 2009/122483 A1 | 10/2009 |

OTHER PUBLICATIONS

Office Action issued on May 25, 2012 in the corresponding British Patent Application No. 1201228.2.

Japanese Office Action dated Mar. 4, 2014 for Japanese Patent Application No. 2011-277805, with English translation of relevant portions.

\* cited by examiner

IMAGE READING APPARATUS

TECHNICAL FIELD

The present invention relates to an image reading apparatus used in a copier and the like.

BACKGROUND ART

There are broadly two types of image reading apparatuses, used in copiers, scanners, facsimiles, and the like, for reading the entire image by scanning an image at a reading position using a one-dimensional image pickup device. It should be noted that, in general, a direction in which one-dimensional image pickup devices are arranged is referred to as a main scanning direction, and a direction in which scanning is performed is referred to as sub-scanning direction.

In one of the two types, a single-eye lens is used to reduce and transfer the entire image in the main scanning direction onto image pickup devices. This system is mainly used by a copier to read the front side. In this system, the image pickup devices and the lens located at the side of a document are usually fixed, and only a mirror moves in the sub-scanning direction so as to scan the entire document. In this system, the depth of focus (or the depth of field) at the side of the document is rather large in the order of several millimeters, for example, 6 mm. Therefore, this system has an advantage in that the document can be read even when the document is not in close contact with the reading surface for the document of the copier. For example, even when a gutter of a bound book cannot come into contact with the reading surface for the document, this system has an advantage in that the document can be read without any defocus. Therefore, this system has been mainly used by copiers to read the front side. There are various patent documents derived from this method. For example, Patent Document 1 is listed below (hereinafter referred to as conventional method 1).

In the other of the two types, an image in the main scanning direction is divided into a plurality of parts and read by a compound-eye lens. This is usually called as a contact image sensor. This system is used by a copier which reads the back side, a facsimile machine which reads a document, a banknote recognition sensor, a scanner for personal computer, and the like, and is characterized by its small size. For example, Patent Document 2 discloses a conventional technique which has now become a mainstream of an optics system for this contact image sensor. Patent Document 2 discloses an image reading apparatus for obtaining an erect same-magnification-rate image by using a compound-eye lens ("rod lens array" in Patent Document 2) in which a plurality of rod lenses each having a distribution of refractive index defined by a certain function in a radius direction are arranged in a state of array (hereinafter referred to as conventional method 2).

Another typical exemplary system of optics system for the contact image sensor is, for example, a system disclosed in Patent Document 3. In this system, lenses are arranged respectively for cells divided in the main scanning direction, and images in regions respectively corresponding to the cells are reduced and transferred by the lenses onto image pickup devices so as to form images thereon. The output signals provided by the image pickup devices respectively arranged for the cells are combined into an image so as to restore the image existing on the document surface (hereinafter referred to as conventional method 3).

Patent Document 4 is similar to the above conventional method 2 or the above conventional method 3, and discloses a method for obtaining an erect same-magnification-rate image by using a compound-eye mirror lens array (hereinafter referred to as conventional method 4).

Patent Document 5 discloses a method for obtaining an erect same-magnification-rate image on an imaging plane, wherein a reading region is divided into odd-number regions and even-number regions, and an optical path of an imaging optics system is changed according to whether a region is an odd-number region or an even-number region, and wherein the imaging optics system is telecentric (hereinafter referred to as conventional method 5).

Further the applicants of the present application have already disclosed regarding an image reading apparatus with a large depth of field.

Patent Document 1: Japanese Patent Laid-Open No. H10-308852

Patent Document 2: Japanese Patent Laid-Open No. H8-204899

Patent Document 3: Japanese Patent Laid-Open No. H5-14600

Patent Document 4: Japanese Patent Laid-Open No. H11-8742

Patent Document 5: Japanese Patent Laid-Open No. 2005-37448

Patent Document 6: Japanese Patent Laid-Open No. 2009-246623

DISCLOSURE OF THE INVENTION

Problems to be Solved by the Invention

The conventional method 1 has an advantage in that the depth of field is large as explained above, but has a problem in that the optics system is getting large. In addition, the conventional method 1 has further problems in that it is necessary to control a moving speed of multiple mirrors arranged in an optical path extending from the reading surface for the document to a lens in order to prevent the change of the optical path when the mirrors move, and accordingly the cost increases due to this control.

The conventional method 2 has an advantage in being small and inexpensive, but has problems in that the depth of field is small and the chromatic aberration is large.

The conventional method 3 has problems in that when the depth of field is increased, the apparatus becomes larger, and the chromatic aberration becomes larger. In the conventional method 3, since the transfer magnification changes depending on the depth of field, when the images taken in respective imaging optics systems are combined, displacement may occur in the overlapping process of the images. Therefore, it cannot increase the depth of field.

The conventional method 4 has an effect that no chromatic aberration occurs, thanks to use of a mirror array as an imaging optics element, in which a plurality of concave mirrors are arranged. However, such a structure in which the mirror array is aligned on one straight line cannot structure a telecentric optics system with which the transfer magnification of the transferred image is consistent even when the distance from the contact glass to the document varies. This is explained as follows: while the telecentric optics system requires concave mirrors having an aperture area which is greater than the range of field of view of one imaging unit system (or a cell), the aperture area of the concave mirrors cannot be increased to be greater than the arrangement pitch of the concave mirrors, because of the proximity of the concave mirrors to one another.

Thus, since the telecentric optics system cannot be structured according to the conventional method 4, the transfer magnification of the transferred image in one cell changes in accordance with the distance from the contact glass to the document. As a result, the manner of adjacent ones of images overlapping one another becomes different among the cells. Hence, the image on the array boundary section deteriorates, and a large depth of field cannot be obtained.

In the conventional method 5, in a linear object an image thereof is read from oblique directions by odd-number region imaging systems and even-number region imaging systems. Accordingly, there is a problem that, when the position of the object changes in a focus direction, the odd-number region imaging system and the even-number region imaging system become different from each other in the reading position, whereby images respectively obtained by the systems displace from each other on the photosensitive medium serving as an image-forming surface. Moreover, the patent document 5 does not describe the specific structure and effects of a telecentric imaging system. Therefore, when the position of an object in the focus direction changes, the transfer magnification at the focal point position may possibly change. Thus, the images overlap in different manners between the m-th imaging systems and the (m+1)-th imaging systems (m is an integer), which makes the image deteriorate. Due to the above two problems, it is difficult to obtain a large depth of field according to the conventional method 5.

Further, the applicant of the present invention has already proposed an image reading apparatus (WO2009/122483) that solves the problems stated above and that has a large depth of field. That is, as shown in FIG. 30, the image reading apparatus 510 has bending mirrors 111 and 113 interposed in the optical path. Since the optical path from the document 7 is bent laterally by the bending mirror 111, it is advantageous in that the space for installing an illumination 2 can be secured with ease. That is, in a case where the optical path is bent by 90 degrees by the bending mirror 111, the distance from the top panel 3 to the bending mirror 111 can be secured as the installation space for the illumination 2. However, there is also a concern about a possible reduction in assembly precision because of an increase in the number of components attributed to provision of the bending mirrors 111 and 113. Further, there is also a concern about the following two problems as to the obtained image.

The first problem attributed to the presence of the bending mirrors 111 and 113 relates to the surface accuracy of the plane of the bending mirror 111. When its surface is distorted, the image-forming position displaces from the designed position, and distortion may possibly occur.

The second problem lies in the rotation of the obtained image due to any attitude angle error of the bending mirrors 111 and 113 with reference to the light beams.

With reference to FIG. 31, a description will be given of the rotation of the image. The light beams are output in the −Z direction from points 112$a$, 112$b$, 112$c$, ..., on a straight line 132, then deflected and reflected by a bending mirror 111A by 90 degrees, to arrive at a screen 140. The passing points and arriving points of the light beams at the bending mirror 111A and on the screen 140 are 113$a$, ...; and 114$a$, ..., respectively. Straight lines connecting between the passing points and arriving points of the light beams are denoted by 133 and 134, respectively. Here, the bending mirror 111A has an inclined surface whose inclination angle is $\phi$=45 degrees. When it is rotated by $\theta$ about the Z-axis shown in FIG. 31, the obtained image rotates by $\theta'$=$\theta$. That is, provided that the bending mirror 111A rotates by $\theta$ and takes the attitude indicated by 111B, on the mirror side, the passing points 113$a$, ..., of the light beams change to 115$a$, ..., and the arriving points of the light beams onto the screen 140 change from 114$a$, ..., to 116$a$, .... Hence, a straight line 136 that connects the arriving points 116$a$, ..., of the light beam forms an angle $\theta$ with respect to the straight line 134. In this manner, the attitude angle error of the bending mirror 111 results in the rotation of the image on the screen. As shown in FIG. 31, in a case where a light beam is deflected by an angle of approximately 90 degrees by a mirror having the surface inclined by 45 degrees, a large image rotation occurs. The image rotation brings about the phenomenon in which the image is seen as being distorted. Further, such an image rotation phenomenon occurs due to a great oblique incident angle of the light beam relative to the bending mirror. When the light beam is incident approximately perpendicular, the extent of the phenomenon is small.

As described above, even with the image reading apparatus 510 having a large depth of field, there exists possible occurrence of distortion in the obtained image attributed to any manufacturing error and installation error, in association with use of the mirror having a great incident angle.

The present invention has been made to solve the problems described above, and an object of the present invention is to provide an image reading apparatus whose depth of field is large, being small in size, and with which occurrence of distortion in the obtained image can be suppressed.

Means for Solving the Problem

In order to achieve the object stated above, the present invention is structured as follows.

That is, an image reading apparatus according to one aspect of the present invention is an image reading apparatus including:

a light source that emits light to a document;

an imaging optics system that condenses light being the light from the light source reflected from the document to form an image, the imaging optics system being structured with a plurality of cells each being an independent optics system, a plurality of the cells being arranged in a main scanning direction, and being arranged to form two rows of a first row and a second row in a sub-scanning direction being perpendicular to the main scanning direction, the cells arranged in an identical one of the rows are arranged such that light beams directed from the document to the cells out of chief rays are in parallel to one another, and the cells of the first row and the cells of the second row are arranged zigzag in the main scanning direction;

a plurality of image pickup device units that are arranged so as to correspond to the cells, respectively, and that receive the light having passed through the cells;

a memory that stores image information pieces of the document that are respectively sent out from corresponding ones of the image pickup device units in the sub-scanning direction; and a processor that combines image information pieces of adjacent ones of the cells such that images in overlapping areas of the image information pieces stored in the memory match with each other, to create an image of the document, wherein the cells each have first and second reflective light-gathering optical elements that reflect and condense the light from the document, and an aperture, wherein the first reflective light-gathering optical element, the aperture, the second reflective light-gathering optical element are arranged in order in a traveling direction of the light from the document to the image pickup device unit in each of the cells, and wherein the aperture is arranged at a back focal point position of the first reflective light-gathering optical element, to form a telecentric optics system at the side of the document, and as optical elements that bend an optical path, only the first reflective light-gathering optical element and the second reflective light-gathering optical element are provided.

Effect of the Invention

In the image reading apparatus according to one aspect of the present invention, the cells each being an independent optics system structuring the imaging optics system each have the first reflective light-gathering optical element, the aperture, and the second reflective light-gathering optical element, which are arranged in this order in the optical paths directed from the document surface to the image pickup device unit. The aperture is arranged at the back focal point position of the first reflective light-gathering optical element, such that the cell forms a telecentric optics system at the side of the document. Further, since no mirrors that bend the optical paths are present between the document and the first reflective light-gathering optical element, or between the second reflective light-gathering optical element and the image pickup device unit, and moreover, the first reflective light-gathering optical element and the second reflective light-gathering optical element are structured to have a smaller incident angle as compared to a conventional mirror that bends the optical paths, occurrence of distortion in the image attributed to any manufacturing error and installation error can be suppressed.

The image reading apparatus according to one aspect of the present invention includes the light source for applying light onto the document, a plurality of cells arranged in the main scanning direction and arranged in two rows in the sub-scanning direction, the cell forming the telecentric imaging optics system at the side of the document, the image pickup device, the memory for temporarily storing image information, and the processor for reconstructing the image information stored in the memory. With this configuration, the reading region of the document in the main scanning direction is divided, and the plurality of cells read the image of the reading region. Accordingly, the size of the image reading apparatus can be reduced. Further, the cells are arranged in two rows in the sub-scanning direction, and images are obtained from the cells arranged in the rows. Accordingly, the images between the cells can be complemented without causing deterioration of the images obtained from the cells arranged in the main scanning direction. Therefore, a high quality image can be obtained. Further, each cell has the telecentric optics system at the side of the document, so that a subject distance can be increased.

More specifically, since each cell has the telecentric optics system at the side of the document, there is an advantage in that even when the document moves in a focus direction, the transfer magnification of the image does not change. Further, since each cell has the telecentric optics system at the side of the document, the chief ray in the pencil of rays directed from a point (this is called a point E) in proximity to an end of the image range read by a cell to an entrance pupil of the cell is in parallel with the optical axis. Therefore, a lens having a larger aperture than the reading range of the document is necessary in order for all of the pencil of rays directed from the point E to enter into the optics system of the cell without causing vignetting. When the cells are arranged in one row in the sub-scanning direction and arranged adjacent to each other in main scanning direction, a blank is formed in the reading range at a boundary section between the cells. On the contrary, when the aperture of the lens matches a reading width of one cell, there is a problem in that vignetting is caused in the pencil of rays directed from the point E.

For this problem, the image reading apparatus according to one aspect of the present invention has two rows of cells in the sub-scanning direction. For the sake of easy understanding, the cells are numbered. Of the two rows of cells arranged in the sub-scanning direction, the cells in the first row are numbered as n=1, 3, 5, . . . , and the cells in the second row are numbered as n=2, 4, 6, . . . . In the image reading apparatus according to one aspect, the aperture of the cell is configured to be larger than the reading range of the cell. With this configuration, even when there is an unreadable blank range between the adjacent cells in the first row, i.e., at the boundary between the k-th cell and the (k+2)-th cell, the image of the blank range is read by the (k+1)-th cell in the second row so as to complement the images.

Since the cells are arranged in two rows as explained above, the cells in the first row and the second row have different reading positions in the sub-scanning direction. Therefore, the image taken by the cell in the first row and the image taken by the cell in the second row at a certain time are different from each other. In order to correct difference of the images, the image reading apparatus according to one aspect of the preset invention employs a method for combining the taken images using the time it takes to scan a distance between the first row and the second row in the sub-scanning direction. In other words, the image reading apparatus according to one aspect includes a memory, and temporarily stores the read images. The image reading apparatus reads, from the memory, two images that were taken by the cells in the first row and the second row at slightly different times, and the image processor reconstructs the image. Therefore, in the image reading apparatus according to one aspect of the present invention, a normal image can be formed from the read image.

Further, as described above, in the image reading apparatus according to one aspect of the present invention, in all the cells included in the first row and the second row, the light beams, among chief rays of all the cells, which are directed from the document to the cells are in parallel. Accordingly, even when a distance between the cell and the document changes, the position of the image with respect to the image pickup device unit does not change. Therefore, a combined image at a boundary section between the k-th cell and the (k+1)-th cell does not deteriorate.

Thus, as described above, in the image reading apparatus according to one aspect of the present invention, the depth of field is large, and the size of the apparatus can be reduced.

Further, in the image reading apparatus according to one aspect of the present invention, since the cells are arranged zigzag, a sufficient gap exists between adjacent cells. Accordingly, shield plates can be arranged without shielding necessary optical paths. In other words, the shield plates can shield the light other than the desired image such as flare and ghost which are generated by stray light, thus providing a clear image.

Further, the cells can be arranged such that the angles of the chief rays reflected by the document are different in the sub-scanning direction between the cells arranged in the first row and the cells arranged in the second row. This arrangement can reduce the gap in the sub-scanning direction between the reading range on the document surface read by the cells in the first row and the reading range on the document surface read by the cells in the second row. Therefore, it is possible to reduce the capacity of the memory storing the read images.

BRIEF DESCRIPTION OF THE DRAWINGS

These and other aspects and features of the present invention will become clear from the following description taken in conjunction with the preferred embodiments thereof with reference to the accompanying drawings, in which.

BEST MODES FOR CARRYING OUT THE INVENTION

Figure 1:
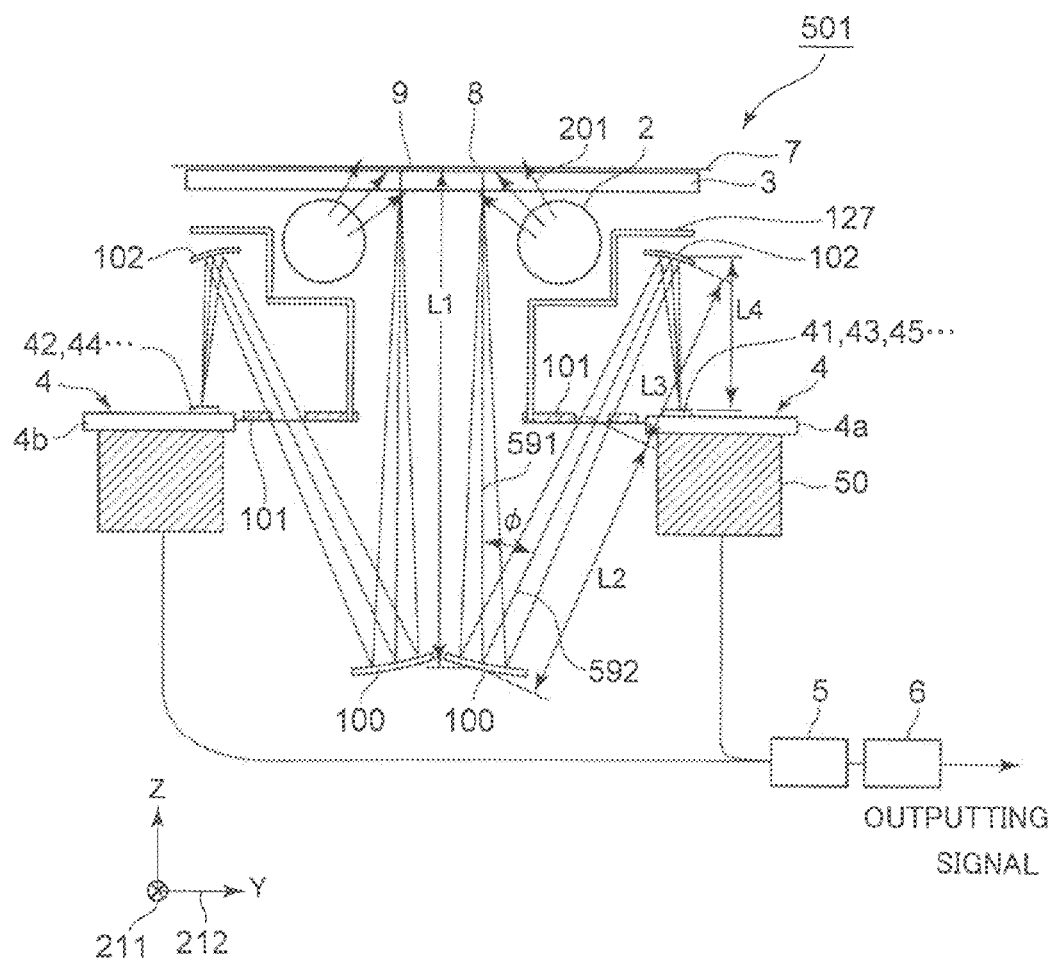
FIG. 1 is a diagram showing a schematic structure of an image reading apparatus according to a first embodiment of the present invention.

In the following, with reference to the drawings, a description will be given of an image reading apparatus according to embodiments of the present invention. It is to be noted that, in the drawings, identical or similar components are denoted by the same reference characters.

First Embodiment

With reference to FIGS. 1 to 18, a description will be given of one example of an image reading apparatus 501 according to a first embodiment of the present invention.

Figure 2:
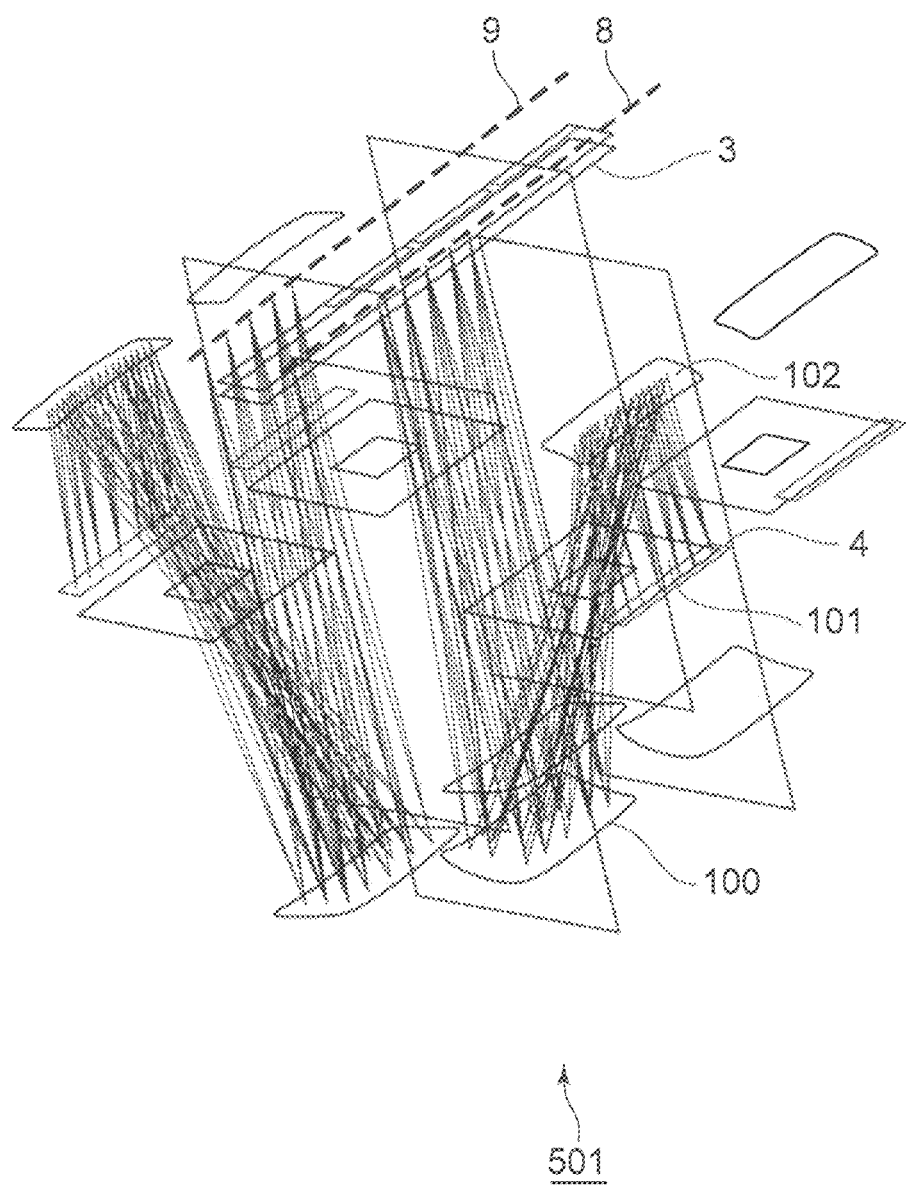
FIG. 2 is a perspective view of a schematic structure of the image reading apparatus according to the first embodiment of the present invention.
Figure 3:
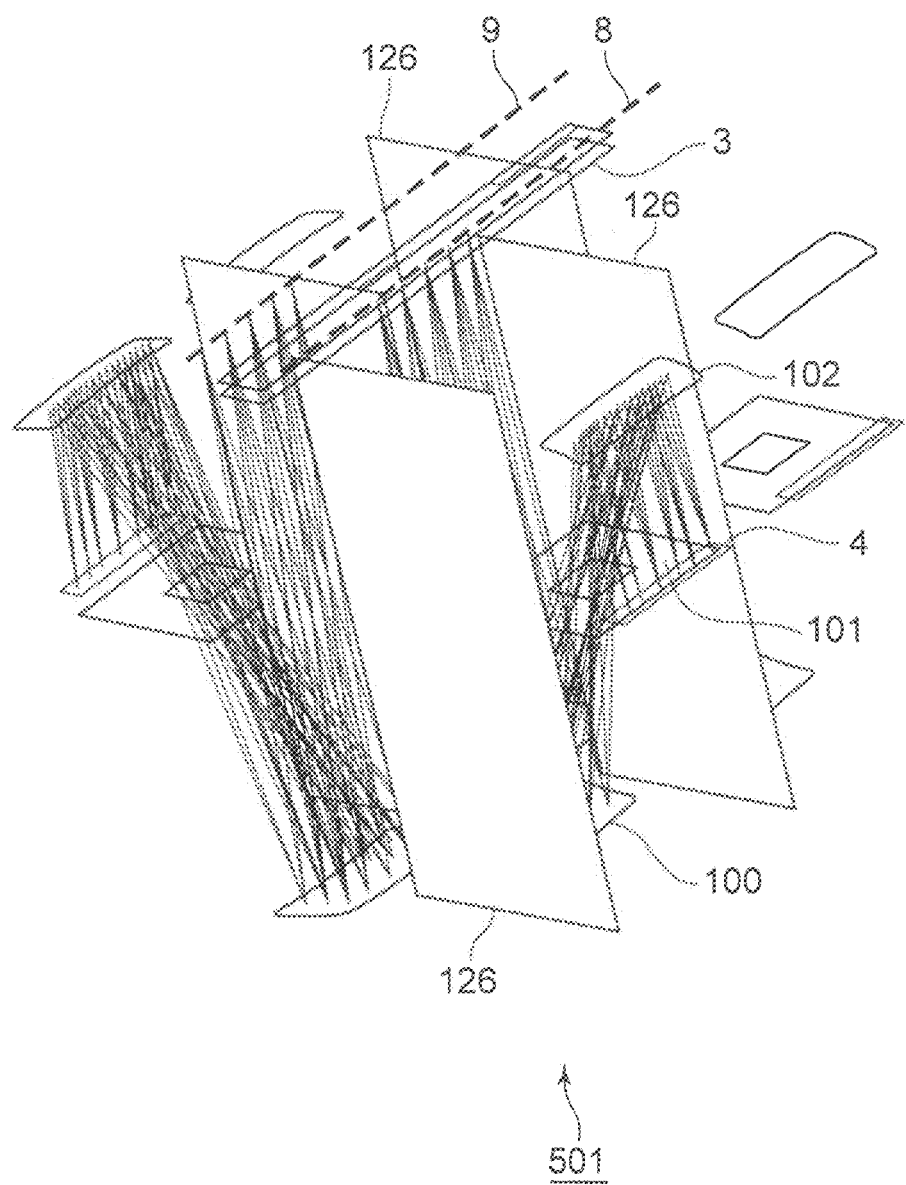
FIG. 3 is a perspective view of the image reading apparatus shown in FIG. 2 to which light shielding members are added.
Figure 5:
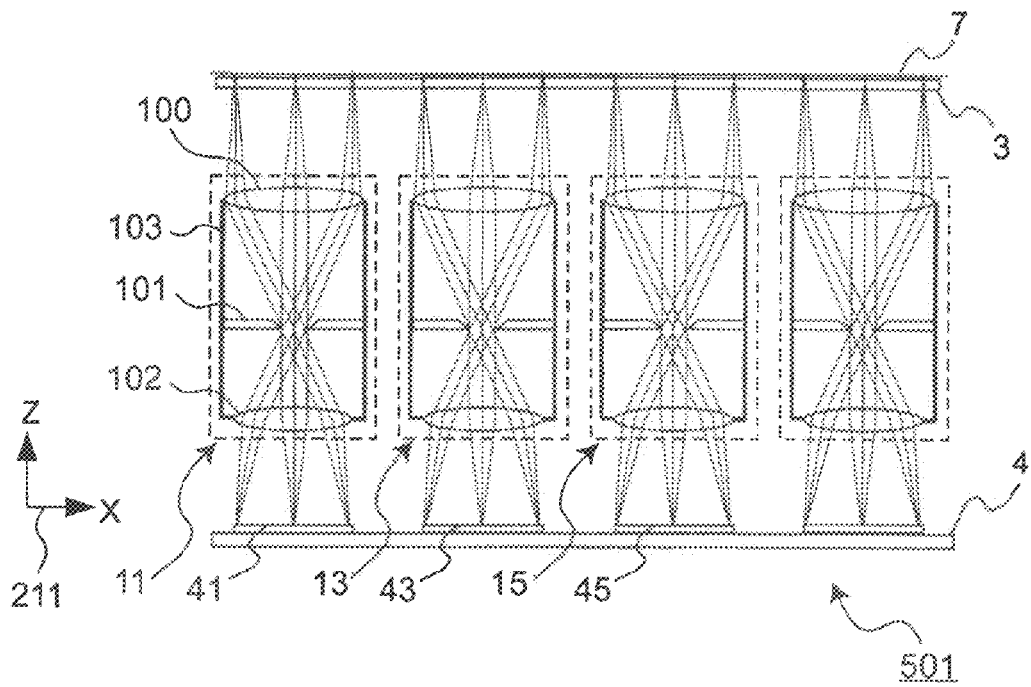
FIG. 5 is a cross-sectional view showing the structure of the main scanning direction in the image reading apparatus shown in FIG. 4.

With reference to FIGS. 1 to 3, as will be described later, the image reading apparatus 501 according to the first embodiment is structured with imaging optics systems of light-reflective systems. The light from reading regions of a document is repeatedly reflected and arrives at image pickup device units. Meanwhile, for the sake of easier understanding and convenient description, for example as shown in FIG. 5, in the following description of the system structure of the image reading apparatus 501, first lenses 100, second lenses 102 and the like included in the imaging optics system are illustrated and described in a manner of lenses in refractive systems.

First, a construction of the image reading apparatus 501 will be explained with reference to FIG. 4 to FIG. 18.

Figure 4:
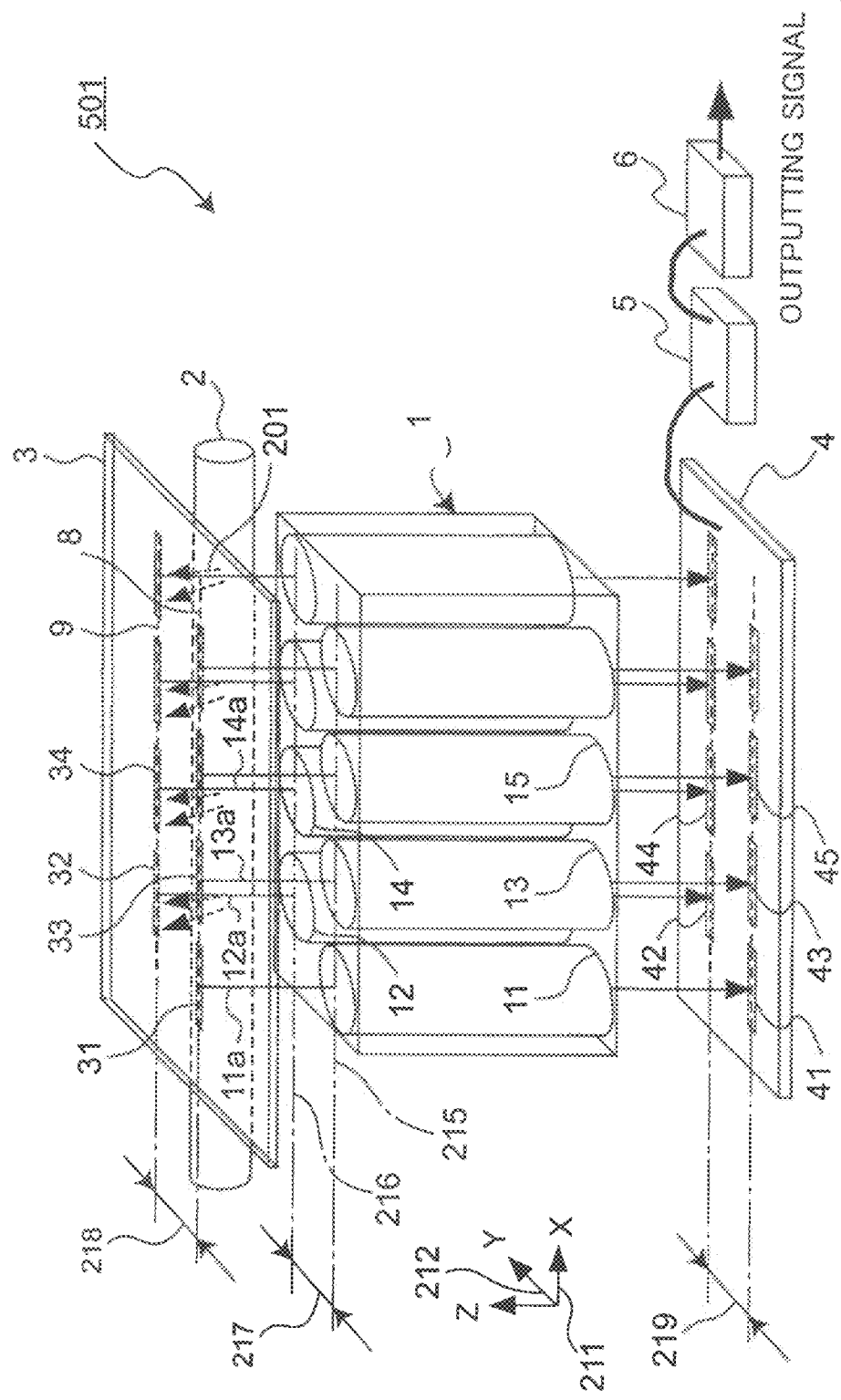
FIG. 4 is a perspective view for describing the structure of the image reading apparatus shown in FIG. 1.

The image reading apparatus 501 according to the present embodiment mainly includes an imaging optics system 1, a light source 2, image pickup device units 41, 42, . . . , a memory 5, and a processor 6. These constituent parts are arranged as follows. The light source 2 is arranged in proximity to a document 7, i.e., an example of an object from which an image is read. The imaging optics system 1, and the image pickup device unit 41 and the like are arranged such that the light reflected on the document 7 can enter the imaging optics system 1. The image reading apparatus 501 reads the image of the document 7 along a main scanning direction (X-direction) 211, and further scans the document 7 in a sub-scanning direction (Y-direction) 212 perpendicular to the main scanning direction 211, thus reading the entire image of the document 7. It should be noted that the document 7 is an object to be read displaying text, drawings, pictures, and the like, and an object to be read such as a banknote and the like. The document 7 serves as a source of a printed document, used for determining whether it is genuine or not, and used as an electronic file. In FIG. 4, the document 7 is omitted for the sake of clarification of the figure.

The document 7 is placed on a top panel 3, which serves as document holding member. The top panel 3 is made of a transparent material, and is usually a glass plate. The illumination light source 2 is, for example, a fluorescent light and an LED. The illumination light source 2 is arranged at a position below the top panel 3 so as not to hinder reading operation of the document 7. The illumination light source 2 applies an illumination light beam 201 to sections to be imaged 31, 32, . . . arranged at reading positions on the document 7. In FIG. 4, the light source 2 is arranged only on one side of the imaging optics system 1 in a sub-scanning direction 212. However, the arrangement is not limited thereto. It is to be understood that the light sources 2 may be arranged on both sides.

Figure 12:
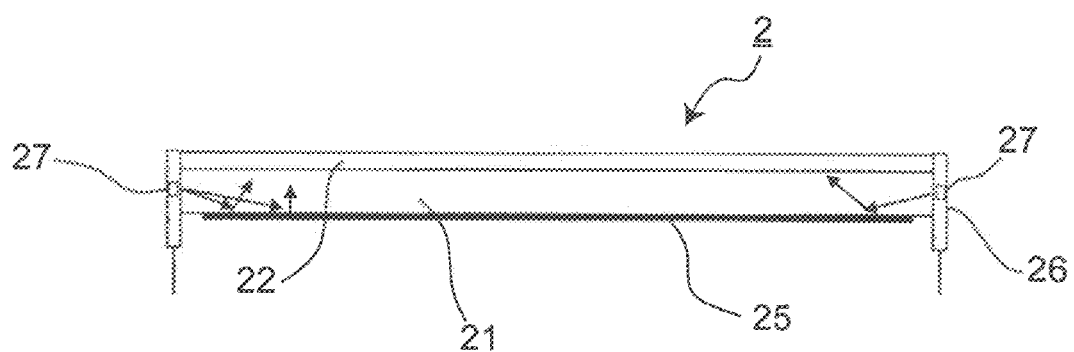
FIG. 12 is a diagram showing the structure of a light source according to the first to third embodiments.

Here, the light source 2 will be explained. FIG. 12 illustrates the structure of the light source 2. The light source 2 mainly includes a light guide body 21 having a light output unit 22 and a light-scattering layer 25, electrode units 26, and light emission sources 27. The light guide body 21 is arranged between the electrode units 26 and the light emission sources 27 arranged at respective longitudinal ends of the light source 2.

Figure 13:
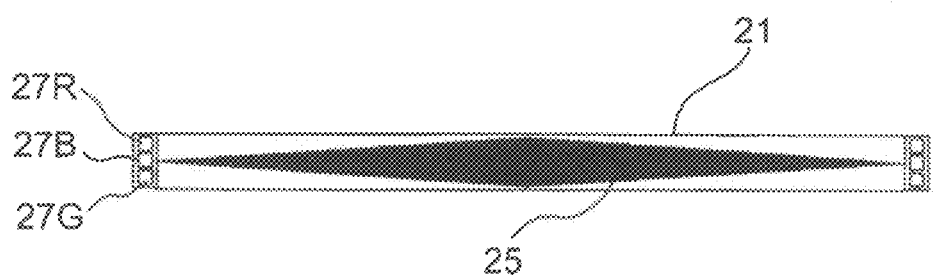
FIG. 13 is a diagram for describing the light source shown in FIG. 12.

The light-scattering layer 25 is arranged so as to extend along substantially the entire length of the light guide body 21. With the light-scattering layer 25, the light is uniformly irradiated from the entire light source 2 in the main scanning direction 211 through the light output unit 22 of the light guide body 21. In the present embodiment, the light emission source 27 is made of LED chips respectively emitting red color (R), green color (G), and blue color (B) wavelengths. As shown in FIG. 13, the electrode unit 26 is arranged with a R light source 27R, a B light source 27B, and a G light source 27G.

In order to uniformly emit light from the light output unit 22, the light-scattering layer 25 is formed to be wide in the center thereof in the main scanning direction 211, when the light emission sources 27 are arranged on both ends of the light guide body 21. When the light emission source 27 is arranged on one end of the light guide body 21, the light-scattering layer 25 is formed to be wider at a position away from the light source 27. FIG. 13 shows the light-scattering layer 25 that is formed to be wide in the center thereof in the main scanning direction 211.

The optical wavelengths of the RGB light sources 27 are substantially the same as the wavelengths of RGB colors of RGB filters arranged on a light receiving part 402.

The above-described structure of the light source 2 is the same not only in the image reading apparatus according to the first embodiment but also in the image reading apparatus according to the second embodiment explained later.

In FIG. 4, the sections 31, 32, . . . to be imaged are indicated enclosed in a rectangular frame for the sake of easy understanding in terms of explanation and visual appearance. However, the sections 31, 32, . . . actually do not have any structural object of the rectangular frame. For the sake of explanation, a portion in which the sections 31, 33, . . . are arranged along the main scanning direction 211 is defined as a reading line 8, and a portion in which the sections 32, 34, . . . are arranged along the main scanning direction 211 is defined as a reading line 9.

The imaging optics system 1 forms an image by condensing the scattered light of the illumination light beam 201 provided by the light source 2 and reflected by the sections 31, 32, . . . . The imaging optics system 1 has a plurality of cells 11, 12, . . . . Each of the cells 11, 12, . . . is an independent imaging optics system, and has a telecentric optics system at the side of the document 7. The plurality of cells 11, 12, . . . are arranged in the main scanning direction 211. In the sub-scanning direction 212, the cells 11, 12, . . . are arranged in two rows, i.e., a first row 215 and a second row 216. In this example, the cells 11, 13, 15, . . . belong to the first row 215, and the cells 12, 14, . . . belong to the second row 216. The cells in the same row are arranged such that light beams, directed from the document 7 to the cells 11, 12, . . . , among the chief rays in the cells are in parallel with each other. The phrase "light beams, directed from the document 7 to the cells 11, 12, . . . , of the chief rays in the cells" may be paraphrased as "optical axes". In other words, the cells 11, 13, . . . are arranged such that optical axes 11*a*, 13*a*, . . . of the cells 11, 13, . . . in the first row are in parallel with each other, and the cells 12, 14, . . . are arranged such that optical axes 12*a*, 14*a*, . . . of the cells 12, 14, . . . in the second row are in parallel with each other.

Further, the cells 11, 12, 13, . . . of the first row 215 and the second row 216 are arranged zigzag in the main scanning direction 211 so that formed images can be complemented by between the cells 11 and 12, the cells 12 and 13, the cells 13 and 14, . . . in the sub-scanning direction 212, respectively.

The arrangement and optical paths of elements in the optics system constituting the cells 11, 12, 13, . . . will be explained.

Figure 6:
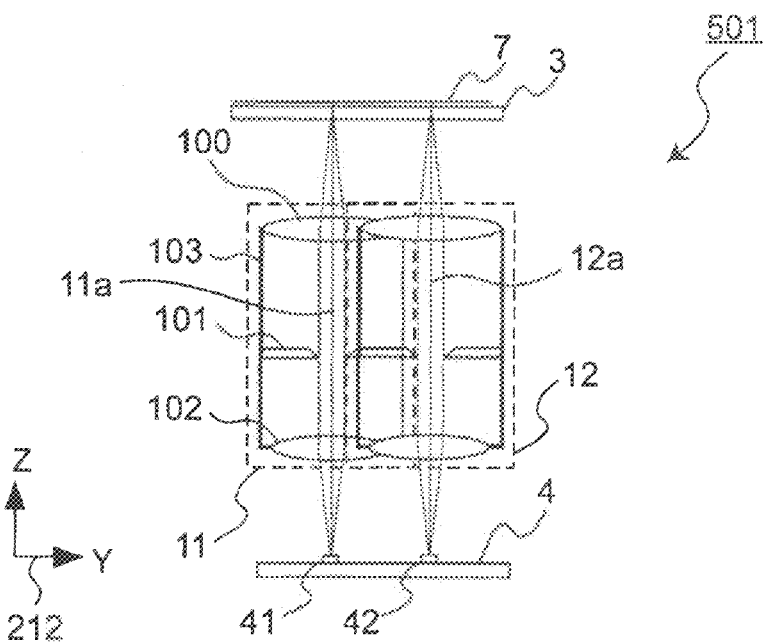
FIG. 6 is a phantom view showing the structure of the sub-scanning direction in the image reading apparatus shown in FIG. 4.

FIG. 5 illustrates main optical paths and imaging optics system elements of the cells 11, 13, 15, . . . of the first row 215 in the main scanning direction 211. FIG. 6 illustrates main optical paths and imaging optics system elements when the cell 11 and the cell 12 are shown in an overlapping manner in the sub-scanning direction 212.

Each of the cells 11, 12, 13, . . . has the same structure. So, in the below explanation, the cell 11 will be explained as an example representing the cells. The cell 11 includes a first lens 100 serving as an example of a first optical element, an aperture 101 serving as an example of diaphragm, a second lens 102 serving as an example of a second optical element, and a holder 103 holding them. In the cell 11, the aperture 101 is arranged at a back focal point position of the first lens 100, so that the cell 11 can achieve a telecentric optics system at the side of the document 7.

In the first embodiment, the cells 11, 12, 13, . . . are arranged such that the optical axes of the first lenses 100, the apertures 101, and the second lenses 102 of the cells 11, 12, 13, . . . are perpendicular to the top panel 3 as shown in the figure, and in the present embodiment, the optical axes are in parallel with a Z-direction. Therefore, all the chief rays in pencils of rays of light contributing to forming an image and reflected by reading ranges on the document 7 respectively taken care of by the cells 11, 12, 13, . . . are perpendicular to the top panel 3.

The image pickup device units 41, 42, . . . are arranged on a substrate 4 to correspond to the cells 11, 12, 13, . . . . In other words, the image pickup device units 41, 43, . . . are arranged to correspond to the cells 11, 13, . . . of the first row 215, and the image pickup device units 42, 44, . . . are arranged to correspond to the cells 12, 14, . . . of the second row 216.

Figure 14:
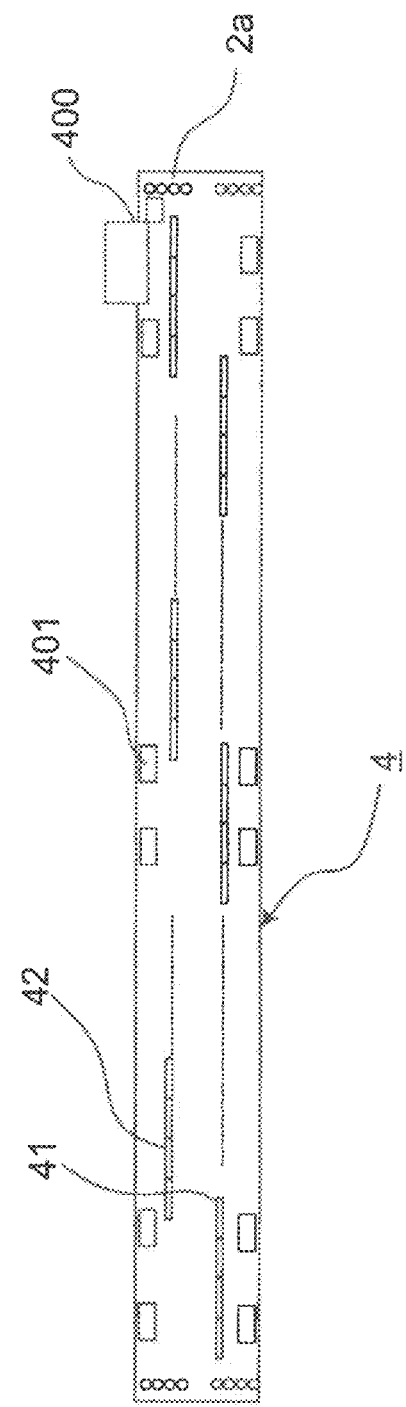
FIG. 14 is a plan view of an image pickup device substrate according to the first and second embodiments.

Here, the image pickup device units 41, 42, . . . will be explained. FIG. 14 is a top view showing the substrate 4 having image pickup device units 41, 42, . . . . Numeral 2a denotes a light source connection unit for electrically connecting between the illumination light source 2 and a connector 400 of the image pickup device substrate 4.

The image pickup device units 41, 42, . . . are structured by arranging a plurality of light receiving parts, which are made of CCDs and the like, in the main scanning direction 211, or further arranging, in the sub-scanning direction 212, a plurality of rows of the above plurality of light receiving parts arranged in the main scanning direction 211.

Figure 15:
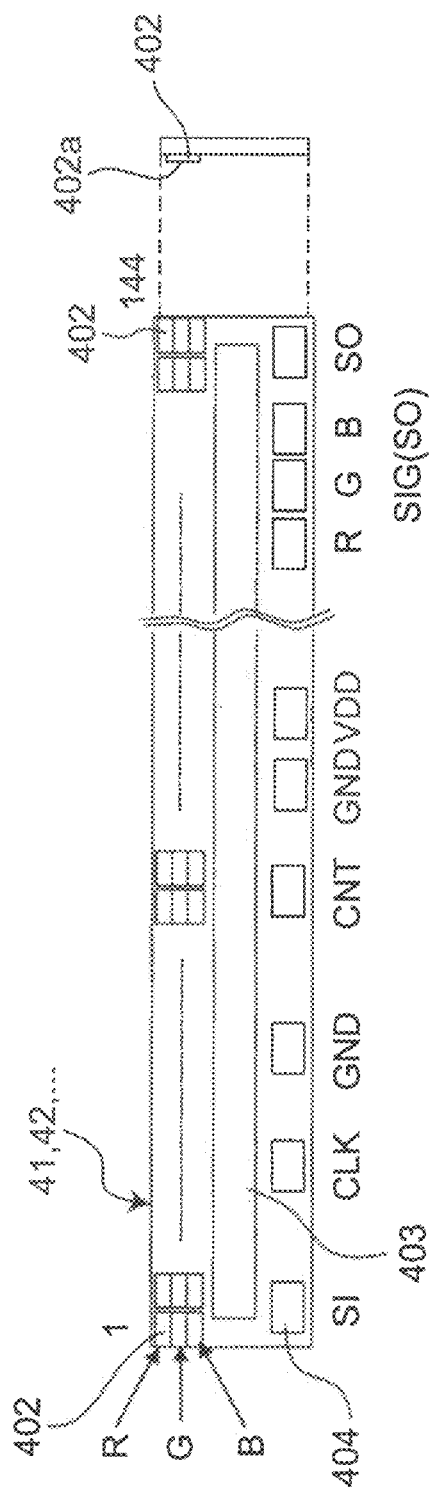
FIG. 15 is a plan view showing the structure of an image pickup device unit according to the first and second embodiments.

FIG. 15 is a top view showing the image pickup device units 41, 42, . . . . The image pickup device units 41, 42, . . . mainly include light receiving parts 402, a drive circuit of photoelectric conversion and RGB shift register 403, and an input/output part 404. The light receiving part 402 is an image pickup device arranged with an RGB filter 402a on a light detection surface. The RGB filter 402a includes red color (R), green color (G), and blue color (B) for one pixel, and is made of gelatin material. In the image pickup device unit 41 and the like, the light receiving parts 402 are arranged for 144 pixels along the main scanning direction 211. In other words, 144 light receiving parts 402 are arranged. The drive circuit of photoelectric conversion and RGB shift register 403 photoelectrically converts the light incident to the light receiving part 402 for each of RGBs, and holds and drives the outputs thereof. The input/output part 404 is a wire bonding pad section for inputting/outputting signals and electric power to the image pickup device unit 41 and the like.

Respective document images entered into the cells 11, 12, 13, . . . are formed as reversed images on the image pickup device units 41, 42, 43 . . . by passing through the first lens 100, the aperture 101, and the second lens 102. For example, the image on the document 7 in the section 31 on the reading line 8 passes through the cell 11 and forms an image on the image pickup device unit 41, and the formed image is taken by the image pickup device unit 41. The image in the section 32 on the reading line 9 passes through the cell 12 and forms an image on the image pickup device unit 42, and the formed image is taken by the image pickup device unit 42.

The transfer magnification of the cells 11, 12, 13, . . . may be larger than 1 (i.e., enlargement operation) or may be smaller than 1 (i.e., reduction operation). When the transfer magnification is set to 1, there is an advantage in that sensors with a common resolution available in the market can be utilized.

As described above, in the first embodiment, all the chief rays in pencils of rays of light contributing to forming an image and reflected by reading ranges on the document 7 respectively taken care of by the cells 11, 12, 13, . . . are perpendicular to the top panel 3. Therefore, in the first embodiment, a width in the sub-scanning direction 212 between the reading line 8 including the sections 31, 33, . . . on the document 7 read by the cells 11, 13, . . . of the first row 215 and the reading line 9 including the sections 32, 34, . . . on the document 7 read by the cells 12, 14, . . . of the second row 216 becomes a center-to-center spacing 218. Also, the first embodiment, a width in the sub-scanning direction 212 between the image pickup device units 41, 43, . . . which are arranged with corresponding to the cells 11, 13, . . . of the first row 215 and the image pickup device units 42, 44, . . . which are arranged with corresponding to the cells 12, 14, . . . of the second row 216 becomes a center-to-center spacing 219.

The memory 5 is connected to the image pickup device units 41, 42, . . . , and stores image information transmitted from the image pickup device units 41, 42, . . . .

The processor 6 reads the image information stored in the memory 5, reconstructs an image by combining the image information, and creates the entire image of the document 7. It should be noted that the memory 5 and the processor 6 are shown separately in FIG. 4. However, it is to be understood that the memory 5 and the processor 6 may be arranged on the same substrate.

The memory 5 and the processor 6 will be explained in detail in the below explanation about the operation.

The imaging optics system 1 in the image reading apparatus 501 including the construction as mentioned hereinbefore is structured with the optics systems of light-reflective systems as mentioned at the beginning of the present embodiment. In the following, the actual construction of the optics system in the image reading apparatus 501 will be explained with reference to FIG. 1 to FIG. 3.

Here, FIG. 1 is a diagram showing a cross section taken along the sub-scanning direction 212 in the image reading apparatus 501, in which optical paths in one cell, such as the aforementioned cells 11, 12 and the like, from the document 7 to the image pickup device units 41, 42 and the like in an actual manner. Further, each first lens 100 and each second lens 102 function as one example of the first reflective light-gathering optical element and the second reflective light-gathering optical element, respectively, and are each structured with a concave mirror and reflect off light.

FIG. 2 shows a perspective view of optical paths in an actual manner, in a state where the cells 11, 13, . . . , belonging to the first row 215 and the cells 12, 14, . . . , belonging to the second row 216 are arranged zigzag in the main scanning direction 211. FIG. 3 is a diagram explicitly showing shield plates for avoiding stray light between adjacent ones of the cells in the structure shown in FIG. 2.

As shown in FIG. 1, the image reading apparatus 501 is structured as follows. That is, the first lenses 100 and 100 are provided at positions corresponding to the reading lines 8 and 9 in the Z-direction below the top panel 3, respectively. The first lenses 100 reflect off diagonally upward the light having been reflected from the reading line 8 and the light having been reflected from the reading line 9, respectively, each by an angle φ and in directions being different from each other in the sub-scanning direction 212. It is to be noted that, the angle φ is an angle formed by an optical axis 591 of the light beam from the reading line 8 or 9 to corresponding first lens 100, and an optical axis 592 of the light beam reflected from the first lens 100.

The light beams reflected diagonally upward by the first lenses 100 and 100 pass the apertures 101 and 101 and arrive at the second lenses 102 and 102 arranged near the light sources 2 and 2 arranged under the top panel 3, respectively. Here, the apertures 101 and 101 are arranged at the back focal point position of the first lenses 100 and 100. The light beams again reflected downward by the second lenses 102 and 102 in the Z-direction arrive at the image pickup device units 41, 43, . . . , corresponding to the cells 11, 13, . . . , and the image pickup device units 42, 44, . . . , corresponding to the cells 12, 14, . . . , respectively.

Here, the second lenses 102 and the image pickup device units 41 and 42 are shielded from the light sources by partition walls 127, the apertures 101, and the substrate 4. Further, the substrate 4 is separated into a substrate 4a having the image pickup device units 41, 43, . . . , and a substrate 4b having the image pickup device units 42, 44, . . . . Separation of the substrate 4 advantageously realizes separate adjustment of the reading positions of the document 7 corresponding to the cells 11, 13, . . . , and the cells 12, 14, . . . , by adjusting the position of the substrates 4a and 4b, whereby tilts of the reading positions of the document 7 and the optical axes that occur attributed to any assembly error can be corrected.

As shown in FIG. 1, in the image reading apparatus 501 according to the present embodiment, in the Z-direction being the thickness direction of the document 7, the substrate 4 is positioned at a higher level than the first lenses 100 each being a concave mirror are. Further, below the substrate 4, various electronic circuit components for driving the image pickup device unit 41 and the like are installed. Hence, as compared to a structure in which the substrate 4 is positioned at a lower level than the first lenses 100 are, the image reading apparatus 501 is advantageous in that, as the image processor as a whole, a reduction in thickness can be achieved by the thickness of the substrate 4 and the electronic circuit components.

With reference to FIGS. 1 and 2, in connection with the image reading apparatus 501 structured as described above, a further description will be given of the optical paths of the light reflected from the document 7 in the imaging optics system 1.

The light beams directed from the document 7 to the cells 11, 12 and the like have their optical paths bent and condensed at the first lenses 100 each being a concave mirror. Since the aperture 101 is provided at the back focal point position of each first lens 100, the light beams from the document surface along the main scanning direction 211 being incident upon one cell becomes telecentric at the side of the document surface.

The light beams having passed through the apertures 101 have their optical paths bent and condensed at the second lenses 102 each being a concave mirror, to form images on the image pickup device units 41, 42 and the like.

As has been described, the image reading apparatus 501 is characterized in that no mirrors that bend optical paths exist between the document 7 and the first lenses 100 or between the second lens 102 and the image pickup device units 41, 42, 43, . . . , in the structure of the cells 11, 12 and the like. That is, as has been described with reference to FIG. 30, with the image reading apparatus (WO2009/122483) already proposed by the present applicant, distortion attributed to any manufacturing error and installation error may possibly occur with the obtained image, in association with use of mirrors each having a great incident angle.

Figure 31:
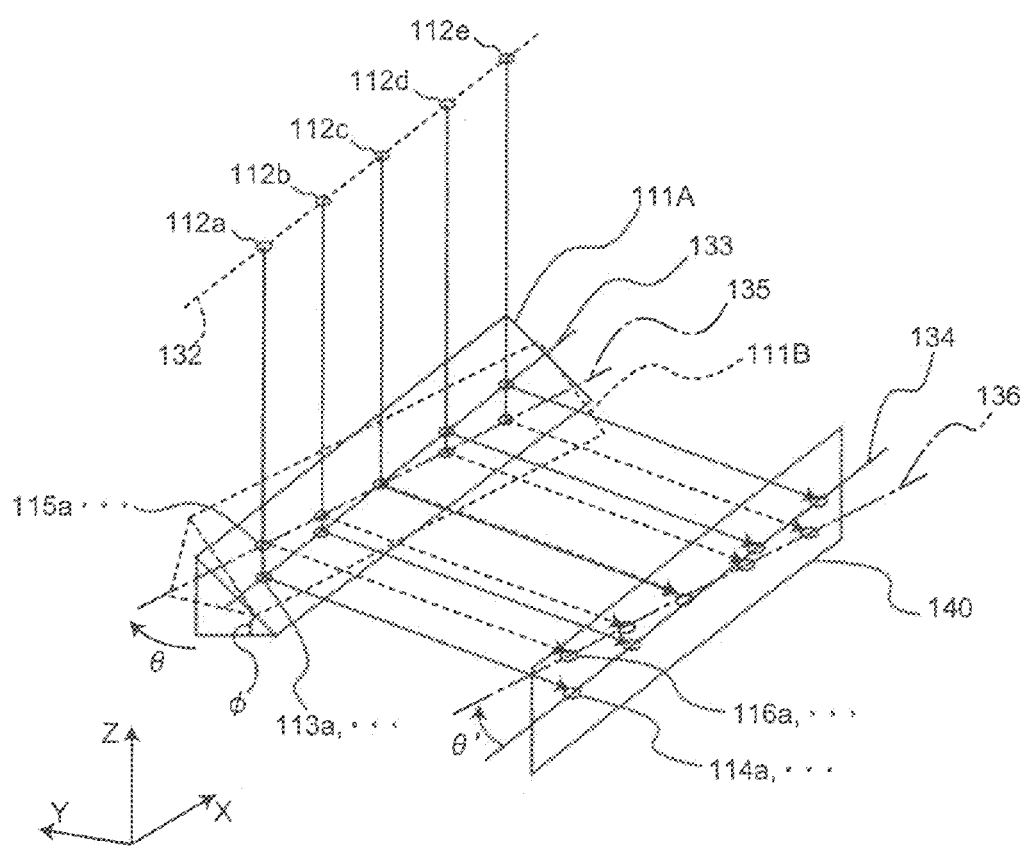
FIG. 31 is a diagram for explaining that rotation θ of a mirror that bends optical paths by 45 degrees causes the transfer positions of the points aligned on a straight line to rotate by θ.

Accordingly, in the image reading apparatus 501 according to the present embodiment shown in FIG. 1, by setting the oblique incident angle of the light beams to the first lenses 100 each being a concave mirror to be smaller than that shown in FIG. 31, and by tilting the first lenses 100 such that the reflected light beams from the first lenses 100 are directed in directions away from each other with reference to the sub-scanning direction 212, the space for installing the light sources 2 and 2 is secured under the top panel 3. In the present embodiment, the oblique incident angle of the light beams at the first lenses 100 are each approximately 10 degrees, being far smaller than 45 degrees of the bending mirrors 111. Similarly, the oblique incident angle of the light beams at the second lenses 102 is approximately 10 degrees and is relatively small. Hence, the rotation angle of an image attributed to the installation error of the first lenses 100 and the second lenses 102 is small. Thus, with the image reading apparatus 501 according to the present embodiment, provision of the first lenses 100 and the second lenses 102 at which each incident angle of the light beams is relatively small can avoid the two problems described above.

Figure 32:
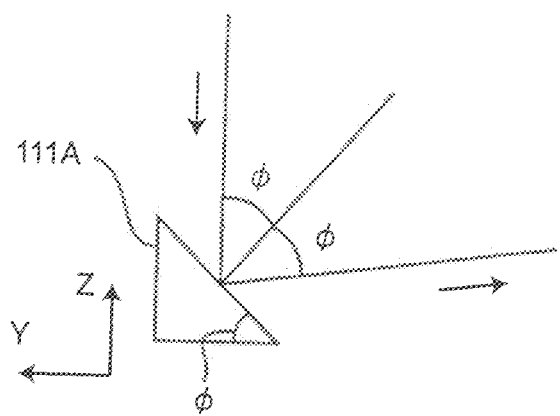
FIG. 32 is a diagram showing a light beam being reflected from the mirror shown in FIG. 31.
Figure 33:
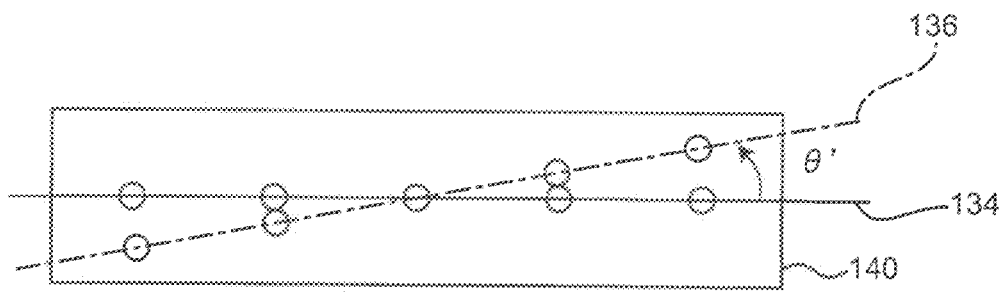
FIG. 33 is a diagram for describing rotation of an image when the mirror rotates as shown in FIG. 31.
Figure 34:
FIG. 34 is a graph in which the horizontal axis indicates an incident angle φ of a light beam and the vertical axis indicates the sensitivity, which is the ratio of an image rotation angle θ' to the rotation angle θ of the mirror shown in FIG. 31.

In order to specifically describe the foregoing, the calculated model and the calculation result thereof are shown in FIGS. 32 to 34 together with FIG. 31 referred to in the foregoing. As shown in FIG. 31, the light beams are output in the −Z direction from the points 112a, 112b, 112c, . . . , on the straight line 132 being parallel to the X-axis, and become incident upon the bending mirror 111A by the incident angle φ. As shown in FIG. 32, the reflected light is reflected in the direction being away from the Z-axis by an angle 2φ, and arrives at the screen 140. Here, it is assumed that, when the bending mirror 111A rotates by θ about the Z-axis and takes the attitude indicated by 111B, as shown in FIGS. 31 and 33, the image rotates by θ'. FIG. 34 is a sensitivity calculation graph in which the inclination angle φ of the inclined surface of the bending mirror 111A, i.e., the incident angle φ of the light beams, is used as the parameter, and the ratio of the image rotation angle θ' to the rotation angle θ of the bending mirror 111A is defined as the sensitivity of the image rotation phenomenon. As can be seen from FIG. 34, when the incident angle φ of the light beams=45°, the sensitivity θ'/θ is 1. This agrees with the fact that θ'=θ is established when φ=45°, as has been described as to the image rotation occurring in the conventional technique with reference to FIG. 31. The smaller the incident angle φ of the light beams, the smaller the sensitivity. When φ=30°, the sensitivity becomes ½. In the example of the present embodiment, the oblique incident angle of the light beams is approximately 10 degrees. In this manner, by setting the oblique incident angle of the light beams to 30 degrees or less, as compared to the conventional technique where it is 45 degrees, the image rotation can be reduced. That is, the effect of a reduction in the image rotation attributed to any installation error of the first lenses 100 and the second lenses 102 can fully be achieved.

On the other hand, when the oblique incident angle to each concave mirror becomes great, great aberration occurs by the oblique incidental light. With a spherical mirror or an axisymmetric aspheric concave mirror, it is difficult to correct the aberration. Though it depends on the required resolution, by setting the curved surface of the concave mirror to be a free-form surface having curvatures being different between the x-direction and the y-direction in the surface, the aberration is drastically removed, whereby resolution can be improved. The form of the free-form surface is represented by the following formula, for example.

[Mathematical Expression 1]

$$z = \frac{c_x x'^2 + c_y y^2}{1 + \sqrt{1 - (1+k_x)c_x^2 x'^2 - (1+k_y)c_y^2 y^2}} + \sum_{i=1}^{7} \alpha_i x'^i + \sum_{i=1}^{7} \beta_i y^i + z_{offset} \quad \text{(formula 1)}$$

-continued $$c_x = 1/R_x,$$ (formula 2)
$$c_y = 1/R_y$$

$$x' = x + x_{offset}$$ (formula 3)

In this formula, it is assumed that the center of the aperture of each concave mirror is the origin, wherein the x-direction is the sub-scanning direction and the y-direction is the main scanning direction. Further, the center of the aperture is assumed as the position where the optical axis passes. "z" is the sag value of the concave mirror. The origin of the curved surface function (formula 1) is displaced by $x_{offset}$ from the center of the aperture. In this manner, by displacing the central position of the function from the optical axis passing position, the aberration correction can efficiently be carried out addressing the obliquely incidental light beams.

The first term in the formula 1 represents a biconic surface differing in curvature between the x- and y-directions.

The third term in the formula 1, $$\sum_{i=1}^{7} \beta_i y^i$$

is based on an assumption that the optics system is symmetric with reference to positive and negative of "y", and therefore, the odd order coefficients such as $\beta_1$, $\beta_3$, $\beta_5$, and $\beta_7$ and the like are zero. In the second term in the formula 1, $$\sum_{i=1}^{7} \alpha_i x'^i$$

provided that the odd order coefficient $\alpha_1$ is a non-zero value, a curved surface shape that is asymmetric with reference to the positive and negative of "x'" is obtained. Introduction of this odd order term facilitates eliminating the aberration attributed to a great oblique incident angle.

In this manner, by structuring the concave surface of each of the first lenses 100 and the second lenses 102 with a free-form surface, the aberration can be suppressed to be small even with light beams having great incident angle and output angle each being approximately 10 degrees.

With the structure of the image reading apparatus 501 according to the present embodiment, L1<(L2+L3) cos(ϕ) must be satisfied in order to arrange the position of each second lens 102 being a concave mirror at a level lower than the top panel 3, where L1: a distance from the surface of the document 7 to the surface of the first lens 100;

L2: a distance from the surface of the first lens 100 to the aperture 101;

L3: a distance from the aperture 101 to the surface of the second lens 102;

L4: a distance from the surface of the second lens 102 to the light receiving surface of the image pickup device unit 41 and the like; and ϕ: an angle formed between the optical axis 591 and the optical axis 592 as described above.

Since the present embodiment is a telecentric optics system at the side of the document, the distance L2 is equal to a focal point distance f1 of the first lens 100.

With reference chiefly to FIGS. 4 to 11, a description will be given of the operation of the image reading apparatus 501 according to the present embodiment structured as described above.

Illumination light beams 201 emitted from the illumination light source 2 illuminate the document 7 placed on the top panel 3. First, the sections to be imaged 31, 33, 35, . . . , positioned on the reading line 8 of the document 7 are imaged by the cells 11, 13, 15, . . . , and the image pickup device units 41, 43, 45, . . . . That is, the light beams reflected and scattered by the sections 31, 33, 35 . . . , enter the cells 11, 13, 15 . . . , and form images by the image pickup device units 41, 43, 45 . . . , arranged on the substrate 4. Here, actually, the light beams are reflected by and pass through the first lenses 100, the apertures 101, and the second lenses 102 as described above. Image signals respectively sent out from the image pickup device units 41, 43, 45, . . . , are temporarily stored in the memory 5, and the image signals are reconstructed by the processor 6.

Next, the document 7 is scanned in the sub-scanning direction 212, and the sections 32, 34, . . . , positioned on the reading line 9 are taken images by the cells 12, 14, . . . , and the image pickup device units 42, 44, . . . . In this case also, the light beams are actually reflected by and pass through the first lenses 100, the apertures 101, and the second lenses 102 as described above. Image signals respectively sent out from the image pickup device units 42, 44, . . . , are temporarily stored in the memory 5, and the image signals are reconstructed by the processor 6.

Reconstruction of the images obtained by the image pickup device units 41, 42, 43, . . . corresponding to the cells 11, 12, 13, . . . will be explained.

The first row 215 and the second row 216 are away from each other by the center-to-center spacing 217 in the sub-scanning direction 212, and the document 7 is scanned in the sub-scanning direction 212. Accordingly, the cells 11, 13, . . . arranged in the first row 215 and the cells 12, 14, . . . arranged in the second row 216 read different positions on the document 7 in the sub-scanning direction 212. Therefore, images taken by the cells 11, 13, . . . and images taken by the cells 12, 14, . . . at a certain time are different from each other. In other words, an image on the same line in the sub-scanning direction 212 is taken at different times. Therefore, the images obtained by the image pickup device units 41, 42, 43, . . . are temporarily stored in the memory 5 in order to reconstruct the original image of the document from the images taken at different times. Then, the processor 6 reconstructs the original image of the document from the images temporarily stored. Image processing operation for performing the above reconstructing operation when a reversed image can be obtained by the configuration shown in FIG. 5 and FIG. 6 will be hereinafter explained with reference to FIG. 7 to FIG. 9.

Figure 7:
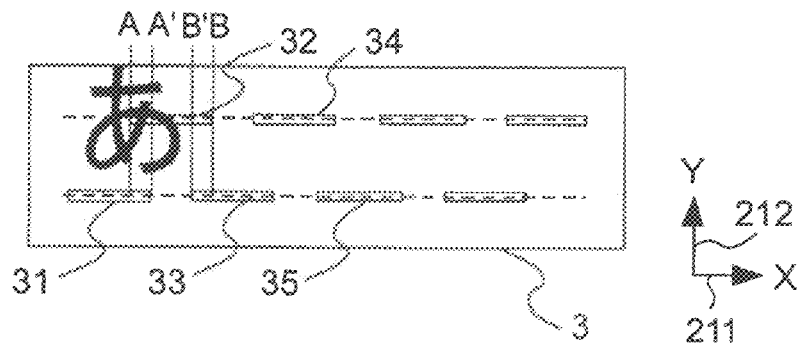
FIG. 7 is a diagram showing one example of arrangement state of reading regions on a top panel and document image character information.

FIG. 7 shows an arrangement of the sections 31, 32, . . . serving as the reading regions on the top panel 3, and also shows a character image of a Japanese character " あ " on the document 7, wherein the document 7 is not shown. In FIG. 7, a range A-A' in the main scanning direction 211 is an overlapped area between the section 31 and the section 32. A range B-B' is an overlapped area between the section 32 and the section 33. When the document 7 is scanned in the sub-scanning direction 212, the character image " あ " is scanned in the Y-direction in terms of relative positional relationship. The reason why the scanning is performed under the "relative positional relationship" is because the scanning may be performed either by moving the document 7 in the sub-scanning direction 212 with respect to the stationary image reading apparatus 501 or by moving the image reading apparatus 501 in the sub-scanning direction 212 with respect to the stationary document 7. In this example, the character image " あ " is assumed to reside in a region extending over the section 31 and the section 32.

Figure 8:
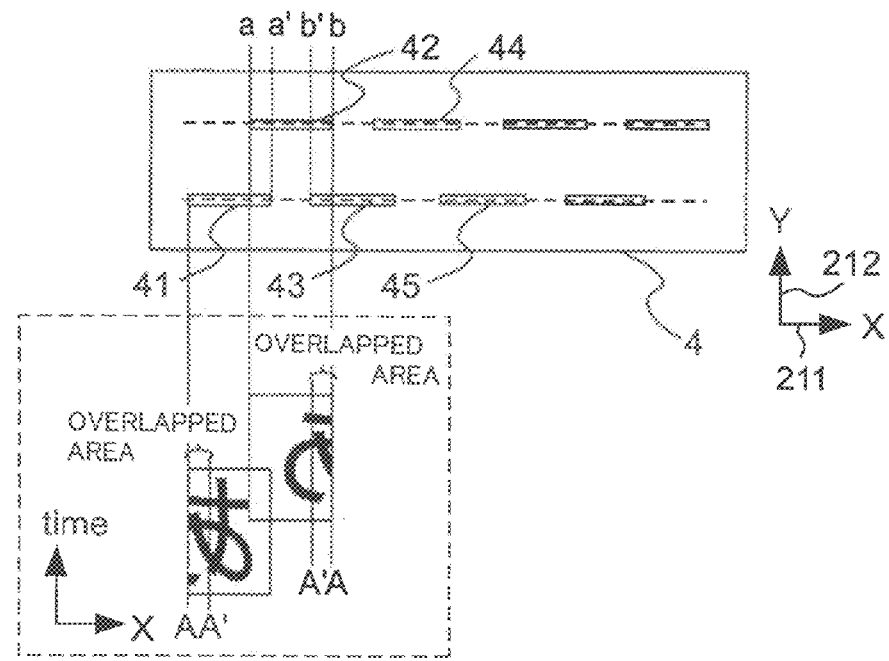
FIG. 8 is a diagram showing one example of arrangement of image pickup device units and a picked up character image.
Figure 9:
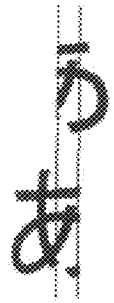
FIG. 9 is a diagram showing one example of character image information picked up and subjected to a reversing process.

FIG. 8 illustrates the image pickup device units 41, 42, ... arranged on the image pickup device substrate 4. In FIG. 8, a range a-a' in the main scanning direction 211 is an overlapped area between the image pickup device unit 41 and the image pickup device unit 42, and a range b'-b is an overlapped area between the image pickup device unit 42 and the image pickup device unit 43. A dashed frame in FIG. 8 schematically shows the image signal of the character image " あ " obtained by the image pickup device unit 41 and the image pickup device unit 42. In the dashed frame in FIG. 8, the vertical axis denotes the time of scanning, and the horizontal axis denotes the main scanning direction 211. The image obtained by the image pickup device unit 41 is a reversed image of the character image " あ " in the section 31 in the main scanning direction 211. Likewise, the image obtained by the image pickup device unit 42 is a reversed image of the character image " あ " in the section 32 in the main scanning direction 211. In FIG. 8, an image in the range A-A' and an image in the range A'-A correspond to the overlapped area between the sections. Each of the images obtained by the two image pickup device units 41, 42 is reversed, and the reversed images are placed so as to align the overlapped area. FIG. 9 shows the two images thus drawn and arranged lengthwise. The original character image " あ " can be obtained by combining the two images in FIG. 9 such that the images in the overlapped areas of these two images match with each other. The processor 6 performs the above combining operation.

In this case, advantages arising from the above combining operation of the images will be explained. The above-explained conventional methods 2, 4, 5 describe the method for making the images obtained from the multiple imaging optics systems into erect same-magnification images and combining on the image pickup device units the images provided by the adjacent imaging optics systems. However, it is not easy to assemble an optical device consisting of mechanical elements such as multiple lenses, mirrors, and the like, in such a manner to eliminate displacement in piecing regions in which images obtained from the adjacent imaging optics systems are joined.

In contrast, the present embodiment employs the method for reconstructing the independent images obtained from the cells 11, 12 ... to the original image by the image synthesis by means of signal processing, namely, by means of software. Therefore, even when assembly, lens manufacturing error, or the like causes a slight error in an overlapped image between a k-th cell and an adjacent (k+1)-th cell, the error can be easily corrected by the software.

As described above, when independent images are obtained for each cell and are combined into an image, there arises an effect of alleviating manufacturing error.

Subsequently, one of the major features of the present invention, namely, a structure for obtaining a large depth of field, will be hereinafter explained with reference to FIG. 10 and FIG. 11 assuming that the document 7 is, for example, a book. When the document 7 is a book and the like, the gutter of the bound book rises away from the top panel 3, and it is necessary for the image reading apparatus to have a large depth of field.

Figure 10:
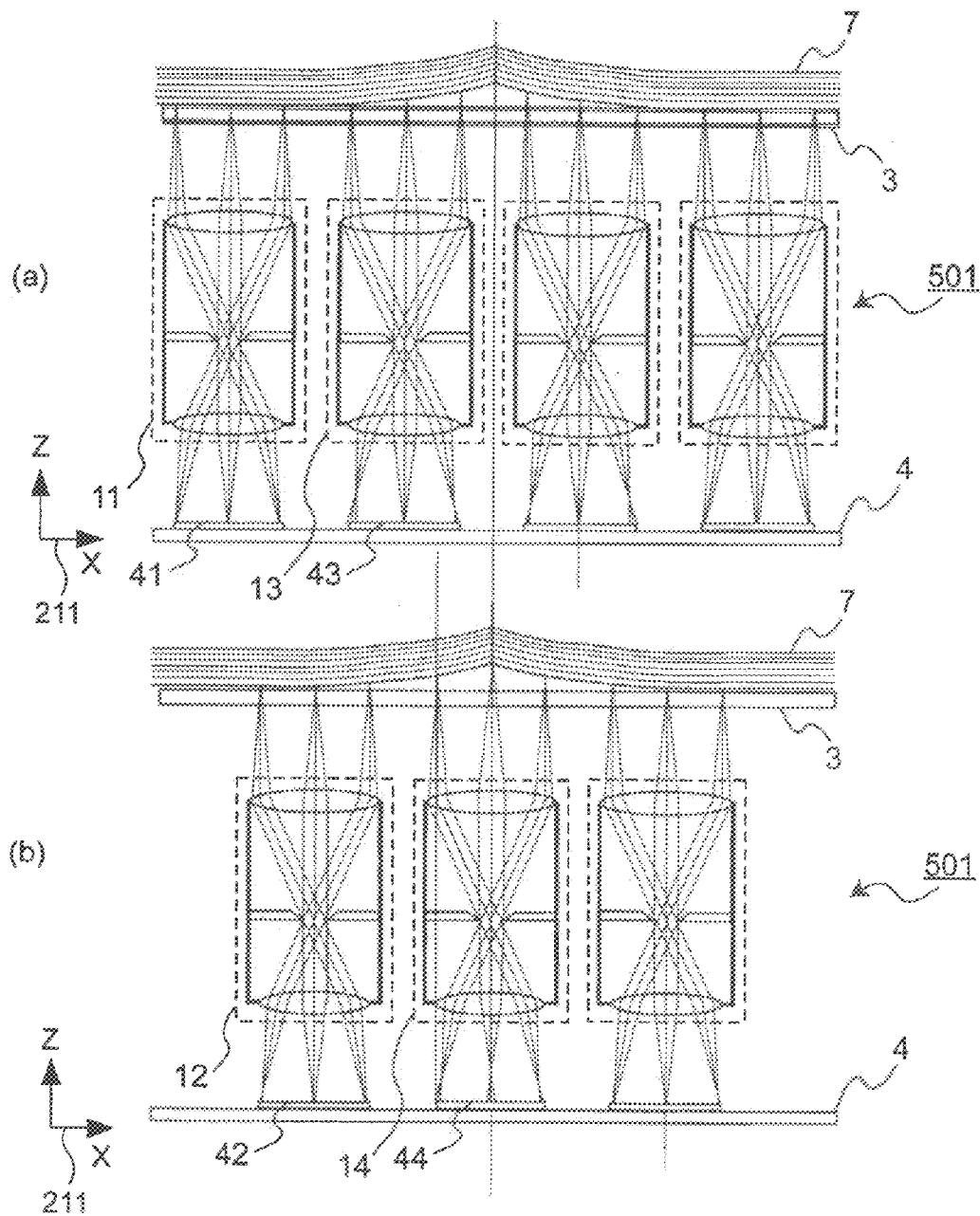
FIG. 10(a) is a diagram showing the manner of a book-like document being by cells in the first row of the image reading apparatus shown in FIG. 4.
FIG. 10(b) is a diagram showing the manner of a book-like document being read by cells in the second row of the image reading apparatus shown in FIG. 4.
Figure 11:
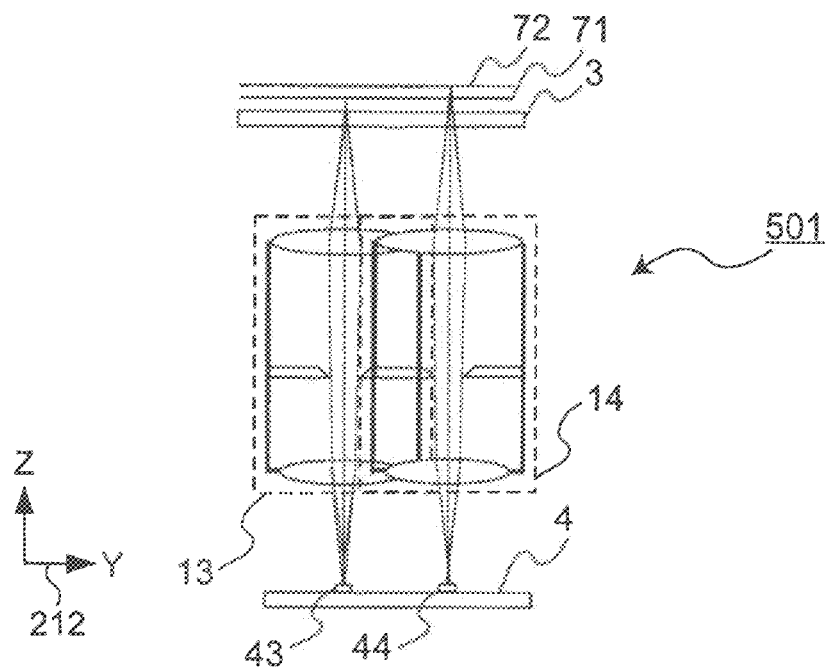
FIG. 11 is a diagram showing the manner of a book-like document being read in the sub-scanning direction by the image reading apparatus shown in FIG. 4.

As shown in FIG. 10, the document 7 is assumed such that a position of the document 7 in a focus direction (Z-direction) changes depending on the position in the main scanning direction 211. FIG. 10(a) shows the cells 11, 13, ... in the first row 215 and the light paths of the cells 11, 13, .... FIG. 10(b) shows the cells 12, 14, ... in the second row 216 and the light paths of the cells 12, 14, .... FIG. 11 illustrates main optical paths and imaging optics system elements of each cell 13, 14 when the cell 13 and the cell 14 are shown in an overlapping manner in the sub-scanning direction 212. FIG. 11 also shows a case where a position on the document surface in the focus direction (Z-direction) changes depending on the position in the main scanning direction 211. In FIG. 11, numeral 71 denotes the maximum height position of the document surface in the section 33 that is read by the cell 13, and numeral 72 denotes the maximum height position of the document surface in the section 34 that is read by the cell 14.

As described above, the cells 11, 12, 13, 14, ... of the image reading apparatus 501 according to the present embodiment constitute the telecentric optics system at the side of the document 7, wherein all the chief rays in the cell 11, 12, 13, 14, ... included in the first row 215 and the second row 216 are perpendicular to the top panel 3. Therefore, the image reading apparatus 501 according to the present embodiment is characterized in that even when a focal point distance to the document 7 changes, the reading position at which the image pickup device unit reads the image does not change.

In other words, there is an effect in that once the parameters for image synthesizing operation are determined when the apparatus is initially assembled or initially activated, the overlapped images are not displaced from each other even when a distance between the top panel 3 and the document 7 changes depending on a point within the surface of the document 7. Therefore, the depth of field of the image reading apparatus 501 according to the present embodiment is substantially determined based on the depth of field of each of the cells 11, 12, 13, 14, .... The depth of field of each of the cells 11, 12, 13, 14, ... is determined by the design of the optics system in the cell. The depth of field is substantially determined by an F value of the optics system. In order for one cell to increase the field of view, it is necessary to sufficiently correct aberration by making the lens in the cell into an aspheric shape, using a plurality of lenses, and the like. When a resolution of 600 dpi is necessary, a depth of field of about ±1 mm can be obtained where the F value is F=10, and a depth of field of about ±2 mm can be obtained where the F value is F=20. The above is merely a rough indication.

In FIGS. 5, 6, 10 and 11, the focal point is on an upper surface of the top panel 3. However, the focal point is not limited thereto. For example, in the optics system having the F value of F=10, the top panel 3 may be arranged such that the focal point is on a plane 1 mm above the upper surface of the top panel 3, so that the depth of field of ±2 mm can be sufficiently made use of.

Figure 16:
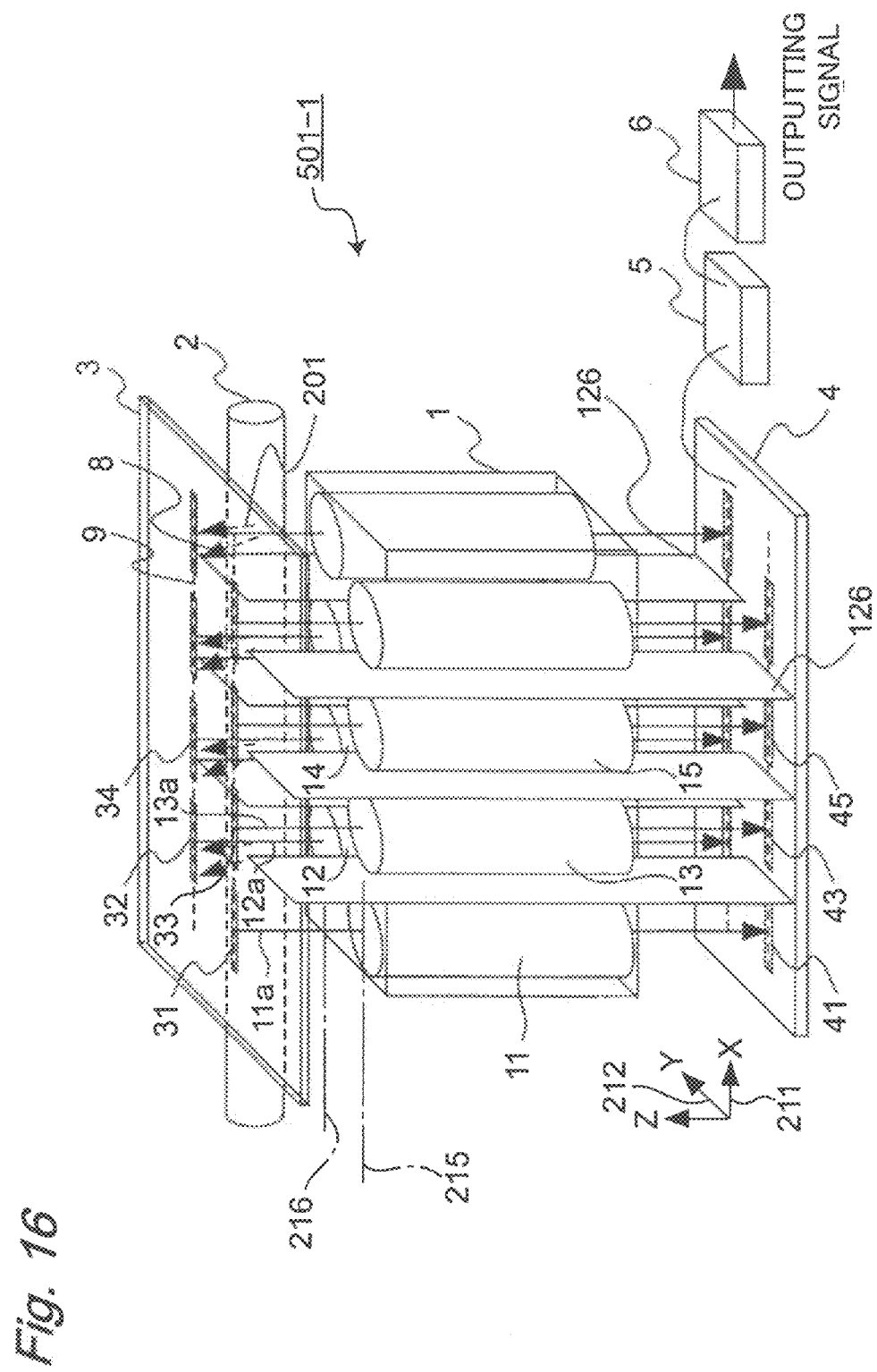
FIG. 16 is a perspective view showing a case where light shielding members are provided to the image reading apparatus shown in FIG. 4.
Figure 17:
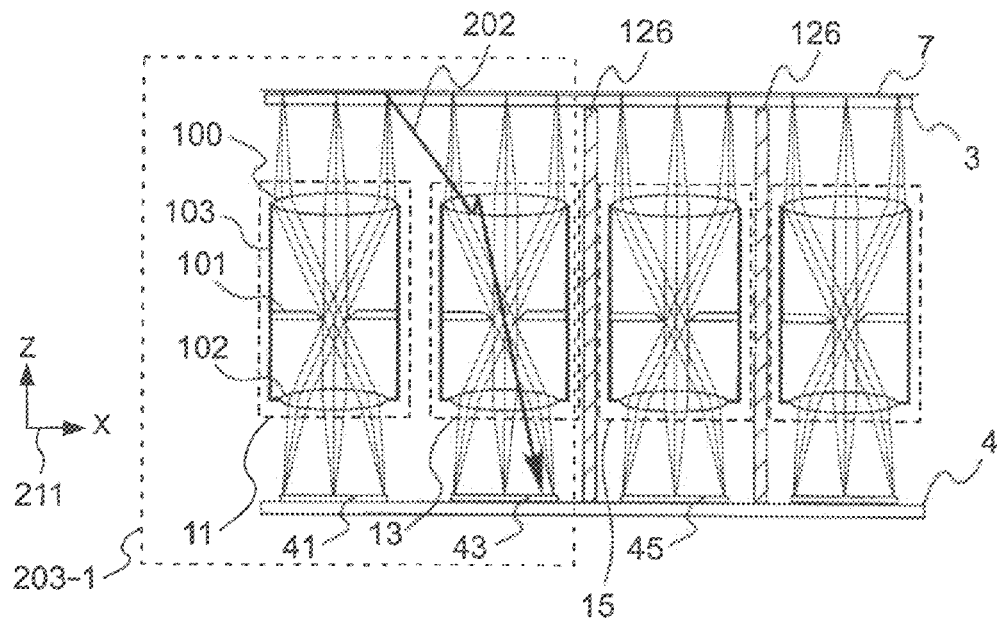
FIG. 17 is a diagram for describing the effects exhibited by the light shielding members in the structure where the cells are arranged zigzag.
Figure 18:
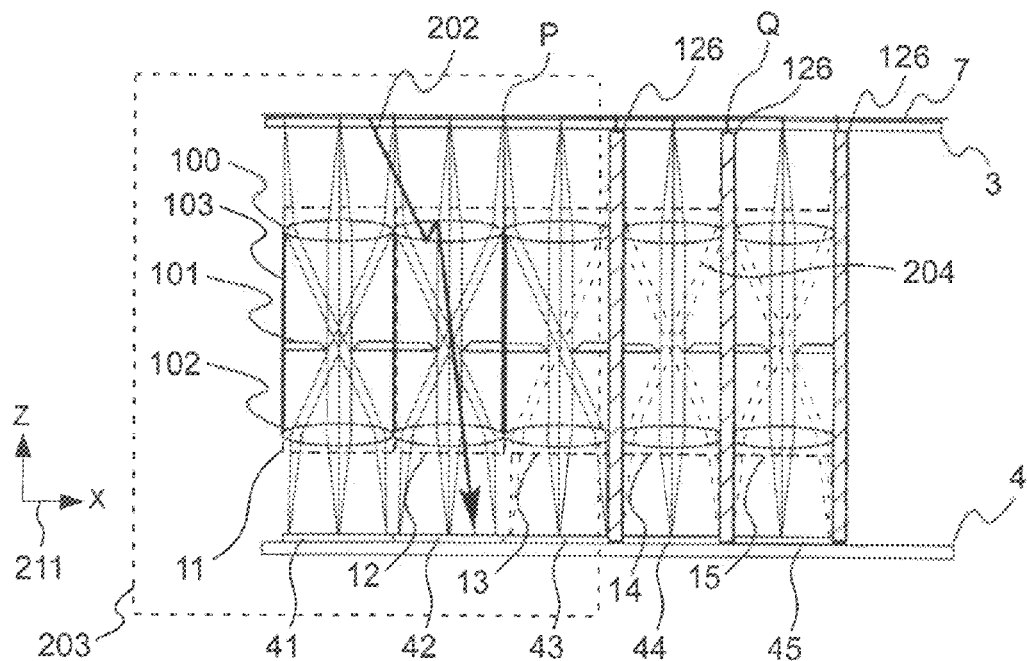
FIG. 18 is a diagram for describing a problem in a structure in which the cells are not arranged zigzag but are simply arranged side by side.

Subsequently, one of the major features of the present invention, namely, ease of prevention of stray light, will be hereinafter explained with reference to FIG. 16 to FIG. 18. FIG. 16 is a schematic view showing an image reading apparatus 501-1 having a light shielding member 126 inserted between the cells in addition to the elements of the image reading apparatus 501 shown in FIG. 4. FIG. 17 is a view for illustrating the effect exerted by the light shielding member 126 for the stray light concerning the cells 11, 13, ... in the first row 215 in the main scanning direction 211. In FIG. 18, the light shielding members are additionally arranged to an image reading apparatus in which the cells are arranged side by side with the telecentric optics system at the side of the document 7. In other words, the cells are not arranged zigzag.

First, using FIG. 18, a problem arising from the configuration in which the cells are not arranged zigzag but arranged side by side will be explained. In FIG. 18, a region 203 enclosed by a dashed line does not have any light shielding member 126 inserted therein. In the outside of the dashed line region 203, the light shielding member 126 is inserted between the cells. In the dashed line region 203, stray light may be generated and go over the boundary between the cells. A stray light beam 202 is an example of such stray light. The stray light beam 202 is a light beam scattered at a high angle in the range of the field of view of the cell 11. The stray light beam 202 enters into the first lens 100 of the cell 12 adjacent to the cell 11. The stray light beam 202 is multiple-reflected in the first lens 100 of the cell 12, and thereafter the stray light beam 202 passes through the aperture 101 of the cell 12 and the second lens 102 of the cell 12. Ultimately, the stray light beam 202 reaches the image pickup device unit 42 corresponding to the cell 12.

As described above, when the light shielding member 126 is not arranged between the cells, the light beam from the range of the field of view of the adjacent cell may stray into the cell. The above stray light may cause a phenomenon called "ghost" in which the image in the range of the field of view of the adjacent cell appears. Even though the stray light beam does not form the image such as the "ghost", the stray light beam may make the whitish image in whole and reduce the contrast of the image, which results in a phenomenon called "flare".

In order to shield this stray light, the light shielding member 126 is inserted between the cells. This state is shown in the outside of the dashed line region 203 on the right side of FIG. 18.

However, when the light shielding member 126 is arranged, there is a problem in that the light shielding member 126 shields even necessary light beams, in proximity to the boundary of the cells, needed for forming an image. When the light shielding member 126 is not arranged, a light beam reflected by a point on the boundary between the cells, e.g., a point P in the figure, separates into the cell 12 and the cell 13, and reaches the image pickup device unit 42 and the image pickup device unit 43. Accordingly, each of the image pickup device units obtains an image signal.

On the other hand, when the light shielding member 126 is arranged, for example, a light beam reflected by a point Q in the figure is shielded by the light shielding member 126. In FIG. 18, optical paths indicated as dashed lines represent optical paths in a case where the light shielding members 126 are not arranged. These optical paths do not exist when the light shielding members 126 are arranged.

As described above, when the cells 11, 12, . . . are not arranged zigzag but are simply arranged side by side, and the light shielding member 126 is arranged between the cells, there is a problem in that an image signal between adjacent cells cannot be obtained, and an image at each boundary of cells is lost.

In contrast, when the cells 11, 12, . . . are arranged zigzag as in the image reading apparatus 501 according to the present embodiment, a gap exists between the cells as can be seen from FIG. 16 or FIG. 17. When the light shielding member 126 is arranged between the gap, the light shielding member 126 can prevent the stray light beam from going over the boundary between the cells without shielding the image signal. This feature will be explained in detail with reference to FIG. 17.

In FIG. 17, the light shielding member 126 is not arranged between the cells in a region 203-1 enclosed by the dashed frame. In this case, the stray light 202 may be generated and go into an adjacent cell, in the same manner as the stray light in the dashed line region 203 as shown in FIG. 18.

On the other hand, in the outside of the dashed line region 203-1 on the right side of FIG. 17, the light shielding member 126 is arranged in order to shield the stray light path 202. When the cells 11, 12, . . . are arranged zigzag, spatial regions in which there is no light beam contributing to image formation exists between the cells. In addition, regions which do not contribute to form images exist between the adjacent sections 31, 33, 35, . . . and between the adjacent sections 32, 34, 36, . . . . Likewise, gaps exist between the adjacent image pickup device units 41, 43, 45, . . . and between adjacent image pickup device units 42, 44, 46, . . . . Therefore, it is possible to arrange the light shielding members 126 in these gaps.

As described above, in the image reading apparatus 501 according to the present embodiment, the cells 11, 12, . . . are arranged zigzag, and therefore, the light shielding members 126 can be arranged between the adjacent cells even when it is a telecentric optics system at the side of the document 7. As a result, the image reading apparatus 501 according to the present embodiment can shield the light beams such as the flare and the ghost generated by the stray light other than the light beams forming the desired image, and can obtain a clear image.

Second Embodiment

With reference to FIGS. 19 to 22, a description will be given of one example of an image reading apparatus 502 according to a second embodiment of the present invention. It is to be noted that, in FIGS. 19 to 22, though the imaging optics system 1 is illustrated in a manner of lenses of refractive systems, similarly to the image reading apparatus 501 according to the first embodiment described above, the image reading apparatus 502 according to the second embodiment also is structured with imaging optics system of optics reflective systems.

In the image reading apparatus 501 according to the first embodiment, as shown in FIG. 5, the light beams which are directed from the document 7 to the cells 11, 13, . . . in the chief rays of the cells 11, 13, . . . of the first row 215 are in parallel with each other, and the light beams which are directed from the document 7 to the cells 12, 14, . . . in the chief rays of the cells 12, 14, . . . of the first row 216 are in parallel with each other. Further, in between the cells 11, 13, . . . of the first row 215 and the cells 12, 14, . . . of the second row 216, the light beams which are directed from the document 7 to the cells among the chief rays are in parallel with each other, as shown in FIG. 6. In the example of the embodiment, since the optical axes go straight ahead, the phrase the "light beams" which are directed from the document 7 to the cells among the chief rays may be paraphrased as "optical axes".

Figure 19:
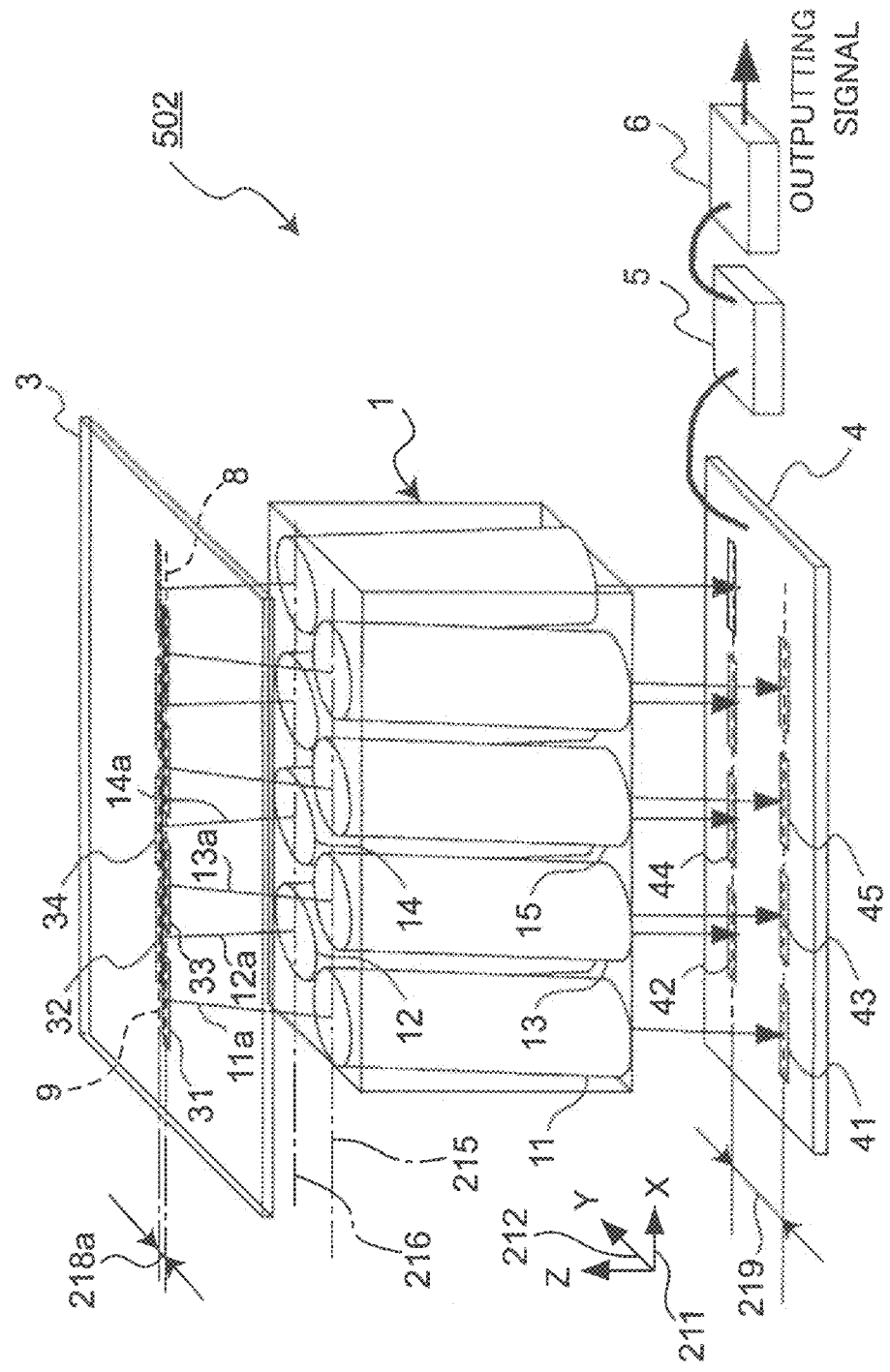
FIG. 19 is a perspective view showing the structure of an image reading apparatus according to a second embodiment of the present invention.
Figure 20:
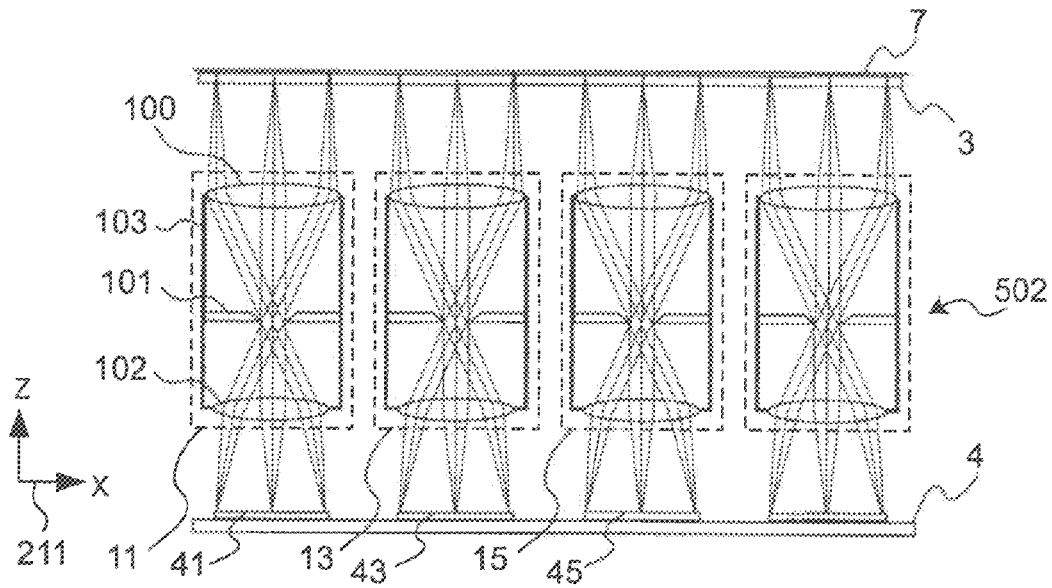
FIG. 20 is a cross-sectional view showing the structure in the main scanning direction in the image reading apparatus shown in FIG. 19.
Figure 21:
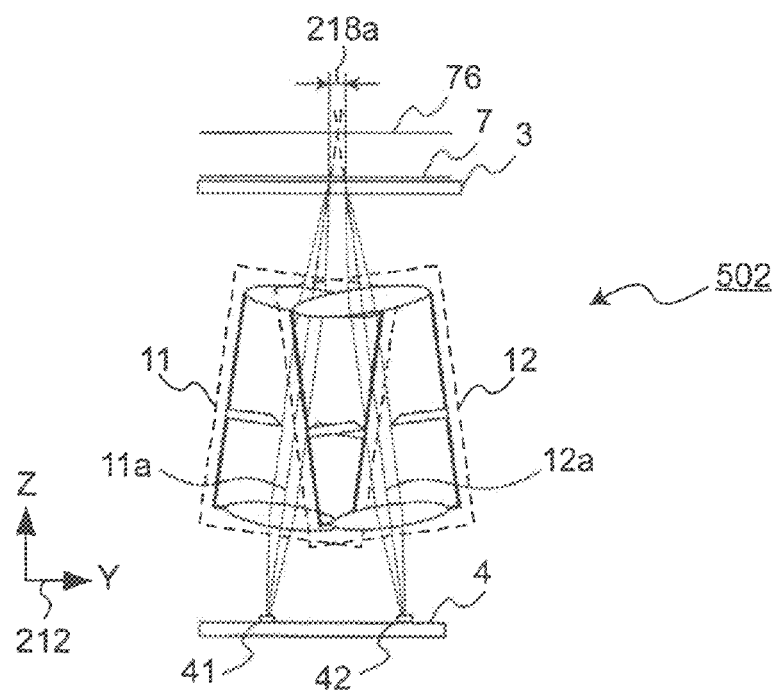
FIG. 21 is a phantom view of the structure in the sub-scanning direction of the image reading apparatus shown in FIG. 19.

In contrast, in the image reading apparatus 502 according to the second embodiment, as shown in FIG. 20, the light beams which are directed from the document 7 to the cells 11, 13, . . . in the chief rays of the cells 11, 13, . . . of the first row 215 are in parallel with each other, and the light beams which are directed from the document 7 to the cells 12, 14, . . . in the chief rays of the cells 12, 14, . . . of the first row 216 are in parallel with each other. However, in the cells 11, 13, . . . of the first row 215 and the cells 12, 14, . . . of the second row 216, respective light beams from the first row and the second row, which are directed from the document 7 to the cells among the chief rays, are not in parallel with each other as shown in FIG. 21. The other structures of the image reading apparatus 502 are not different from the structures of the above-described image reading apparatus 501. Accordingly, in the below explanation, only the different constituent parts will be explained. FIG. 19 does not show the illumination light source 2 for the sake of simplicity of illustration.

As shown in FIG. 19 and FIG. 21, in the image reading apparatus 502, the cells 11, 13, . . . of the first row 215 and the cells 12, 14, . . . of the second row 216 are arranges such that optical axes 11a, 13a, . . . of the cells 11, 13, . . . of the first row 215 and optical axes 12a, 14a, . . . of the cells 12, 14, . . . of the second row 216 are inclined toward the side of the gaps between the first row 215 and the second row 216. More specifically, in the present embodiment, the cells 11, 13, . . . of the first row 215 are inclined about the X-axis (main scanning direction 211) by −10 degrees, and the cells 12, 14, . . . of the second row 216 are inclined about the X-axis by +10 degrees. As a result, in the second embodiment, as shown in FIG. 21, the optical axes 11a, 12a, and the like of them both intersect each other at a position 76 above the top panel 3, and at the top panel 3, the optical axes 11a, 12a, and the like are away from each other by a gap 218a.

Figure 22:
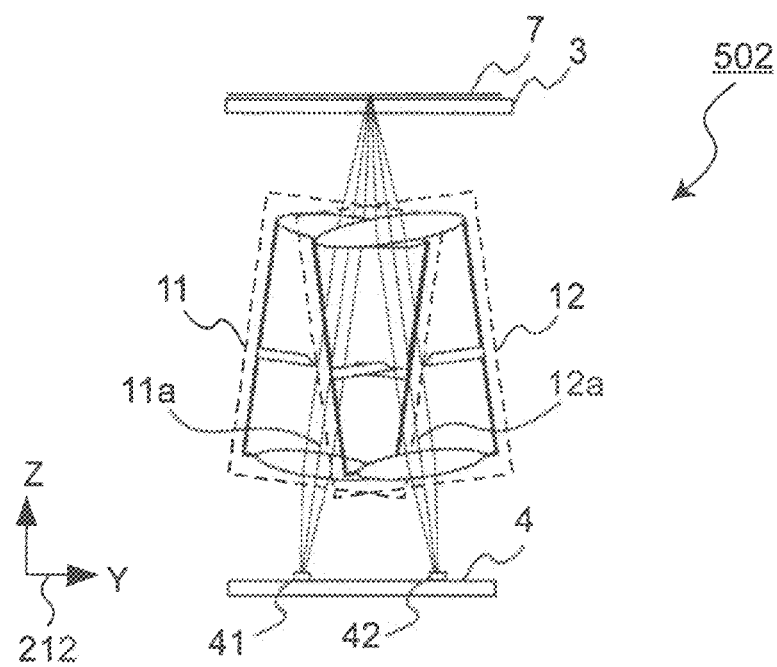
FIG. 22 is a phantom view in the sub-scanning direction in a variation of the structure of the image reading apparatus shown in FIG. 19.

It should be noted that the optical axes 11a, 12a, and the like of them should not necessarily intersect each other at the position 76 above the top panel 3, and may intersect each other on the upper surface of the top panel 3 as shown in FIG. 22. FIG. 19 shows a case corresponding to FIG. 21. In FIG. 19, the reading lines 8 and 9 are away from each other by the center-to-center spacing 218a in the sub-scanning direction. This center-to-center spacing 218a is narrower than the center-to-center spacing 218 of the image reading apparatus 501 shown in FIG. 4.

As described above, the structure of the image reading apparatus 502 according to the second embodiment is basically not different from the structure of the above-described image reading apparatus 501 according to the first embodiment. Therefore, the image reading apparatus 502 can also achieve the above-described effects achieved by the image reading apparatus 501. In addition, the image reading apparatus 502 according to the second embodiment can achieve the following special effects.

That is, as shown in FIG. 21 and FIG. 22, a direction of the optical axes 11a, 12a, and the like of the cells 11, 12, . . . in the first row 215 and the second row 216 are inclined with respect to the top panel 3. Therefore, the reading lines 8 and 9 are arranged closer to each other on the document 7, so that the capacity of the memory 5 temporarily storing the image signals can be reduced, and the cost can be reduced.

In other words, as explained in the first embodiment, the image formed by the cells 11 and the like in the first row 215 and the image formed by the cells 12 and the like in the second row 216 are obtained with a time difference of scanning in the sub-scanning direction 212. Accordingly, it is necessary for the memory to have enough capacity for storing image information corresponding to the above time difference. Therefore, the narrower the center-to-center spacing 218 between the reading lines 8 and 9 in the sub-scanning direction is, the less the capacity of the memory can be. In the image reading apparatus 502 according to the second embodiment, the center-to-center spacing 218a between the reading lines 8 and 9 in the sub-scanning direction is narrower than that of the image reading apparatus 501 as described above. As a result, the capacity of the memory 5 can be reduced to less than that of the image reading apparatus 501.

On the other hand, when the center-to-center spacing 218 between the reading lines 8 and 9 in the sub-scanning direction is narrow, and the document 7 rises away from the top panel 3, there occurs a phenomenon that the image is displaced in the sub-scanning direction 212 depending on a distance of a rise of the document 7 away from the top panel 3. However, since the image reading apparatus 502 according to the second embodiment also has the telecentric optics system at the side of the document 7 as described above, the transfer magnification does not change. Therefore, displacement of image in the main scanning direction 211 does not occur, and the correction therefor can be easily performed by simply shifting an image in the sub-scanning direction 212. The images of these adjacent cells can be combined by shifting the images in the sub-scanning direction 212 such that images representing the same region taken by the adjacent cells match each other.

As has been stated at the beginning of the description of the second embodiment, the image reading apparatus 502 according to the second embodiment also is actually structured with imaging optics system of optics reflective systems. In the following, with reference to FIGS. 23 and 24, a description will be given of an exemplary actual structure.

Figure 23:
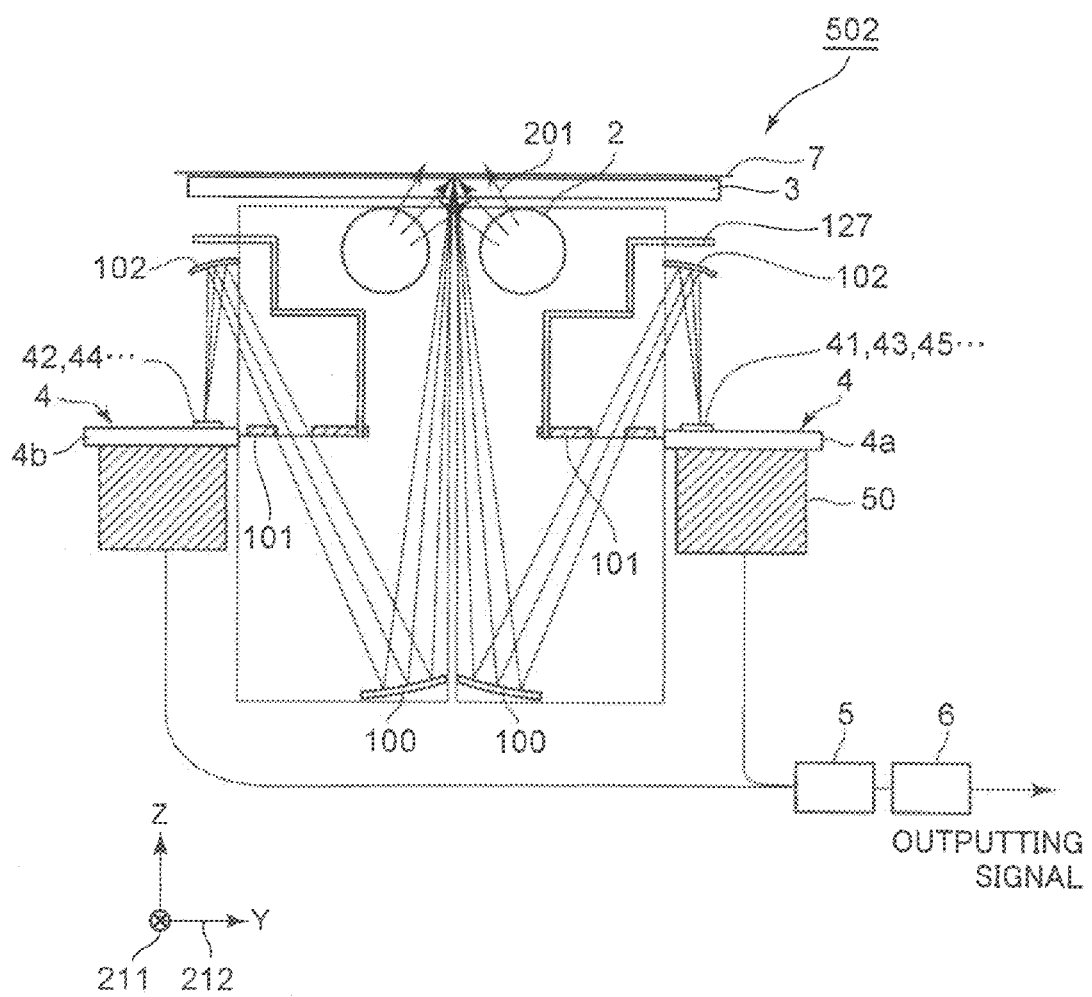
FIG. 23 is a diagram showing the schematic structure of the image reading apparatus shown in FIG. 19, in which the optical paths of cells being arranged to form two rows in the sub-scanning direction to form the imaging optics system are shown.
Figure 24:
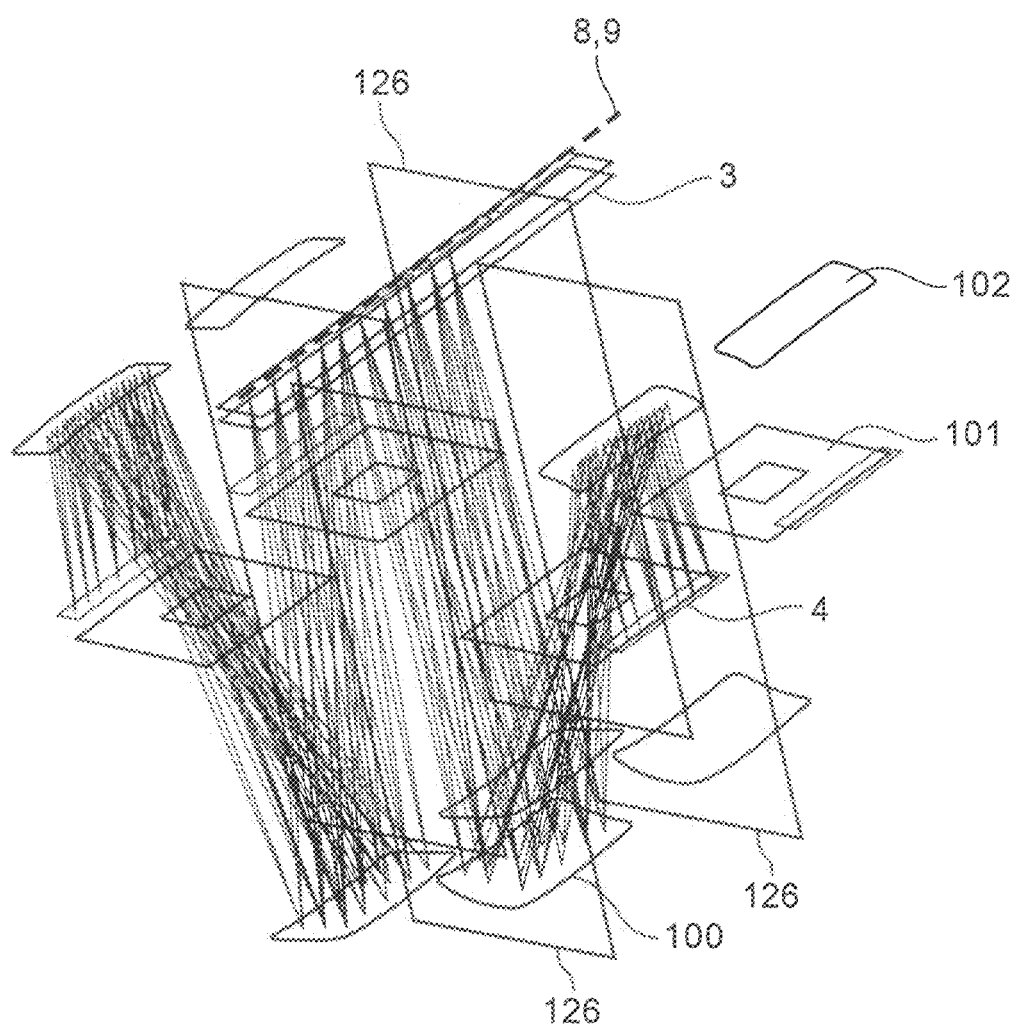
FIG. 24 is a perspective view showing the optical paths in the cells shown in FIG. 19.

FIG. 23 shows the structure of two cells, e.g., the cell 12 and the cell 13, which are disposed side by side in the sub-scanning direction 212 of the image reading apparatus 502 according to the second embodiment. FIG. 24 is a perspective view showing the structure shown in FIG. 19 in an actual manner.

In the second embodiment, as described above, as compared to the image reading apparatus 501 according to the first embodiment, the center-to-center spacing 218a between the reading lines 8 and 9 in the sub-scanning direction 212 is narrower. Hence, in FIGS. 23 and 24, the reading lines 8 and 9 on the surface of the document 7 in each of the cells positioned in the sub-scanning direction 212 are shown in the overlaid state, i.e., at one place.

Though there is such a difference as to the reading lines 8 and 9, the structure of the image reading apparatus 502 according to the second embodiment is similar to the image reading apparatus 501 according to the first embodiment, as shown in FIG. 23.

With reference to FIGS. 23 and 24, a description will be given of the optical paths in the imaging optics system 1 of the image reading apparatus 502.

The light beams scattered at the document 7 and then directed to the cells 11, 12 and the like have their optical paths bent and condensed at the first lenses 100 each being a concave mirror. The aperture 101 is provided at the back focal point position of each first lens 100. The light beam that passes through the center of the aperture 101 is referred to as the chief ray. The chief ray from the document 7 to each first lens 100 tilts in the sub-scanning direction 212.

Similarly to the structure of the first embodiment described above, since the aperture 101 is provided at the back focal point position of each first lens 100, the light beams from the document surface along the main scanning direction 211 being incident upon one cell becomes telecentric at the side of the document surface.

The light beams having passed through the apertures 101 have their optical paths bent and condensed at the second lenses 102 each being a concave mirror, to form images on the image pickup device units 41, 42 and the like.

Similarly to the structure of the first embodiment described above, the substrate 4 is separated into the substrates 4a and 4b so as to correspond to the first row and the second row of the cells. Hence, there exists an advantage that the reading positions of the document 7 can separately be adjusted between the first row and the second row of the cells, by adjusting the positions of the substrates 4a and 4b. This advantage is significant in applications in which the reading positions of the document must closely be matched between the first row and the second row.

Third Embodiment

Figure 25:
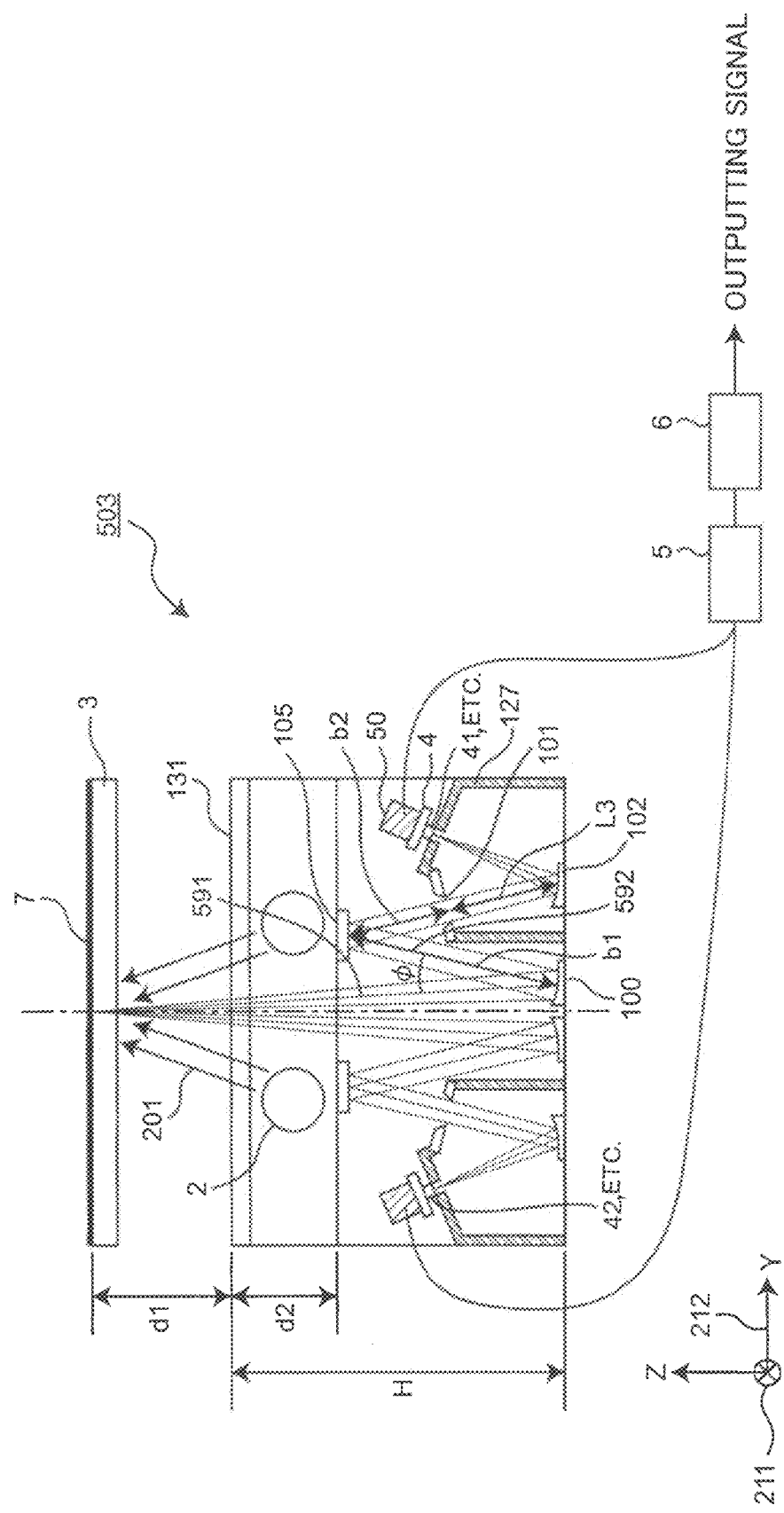
FIG. 25 is a cross-sectional view showing the structure of an image reading apparatus according to a third embodiment of the present invention.
Figure 26:
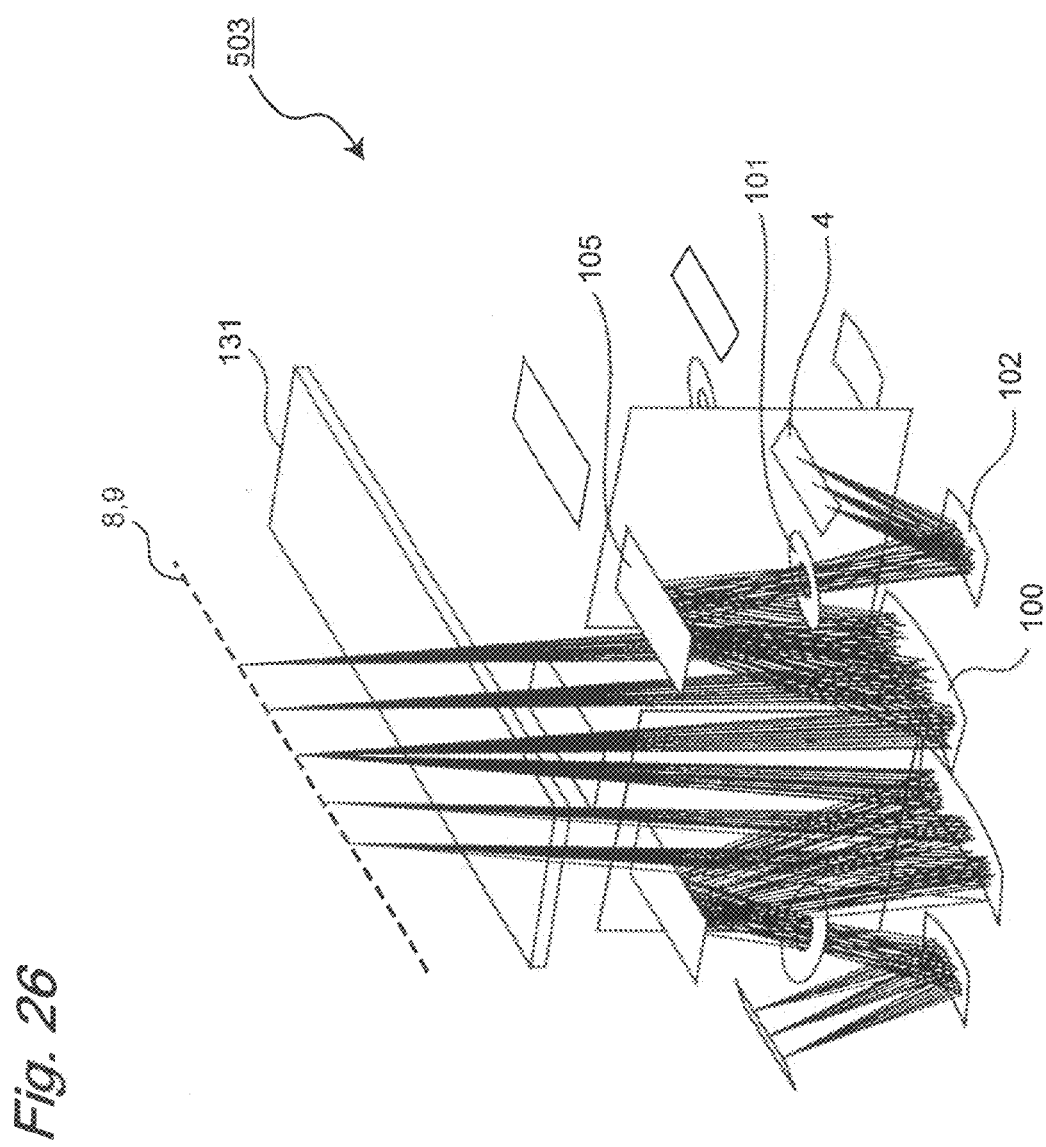
FIG. 26 is a perspective view showing the schematic structure of the image reading apparatus shown in FIG. 25.

FIGS. 25 and 26 show one example of an image reading apparatus 503 according to a third embodiment of the present invention. The basic structure of the image reading apparatus 503 is the same as the structures of the image reading apparatuses 501 and 502 according to the first and second embodiments described above, except for the following point. That is, in the image reading apparatuses 501 and 502, no optical element is provided in the optical paths between the first lens 100 corresponding to one example functioning as the first reflective light-gathering optical element and the aperture 101. On the other hand, in the image reading apparatus 503 according to the third embodiment, a first plane mirror 105 is provided between the optical paths between each first lens 100 and each aperture 101. It is to be noted that this structure is also adopted in fourth and fifth embodiments whose description will follow.

Figure 27:
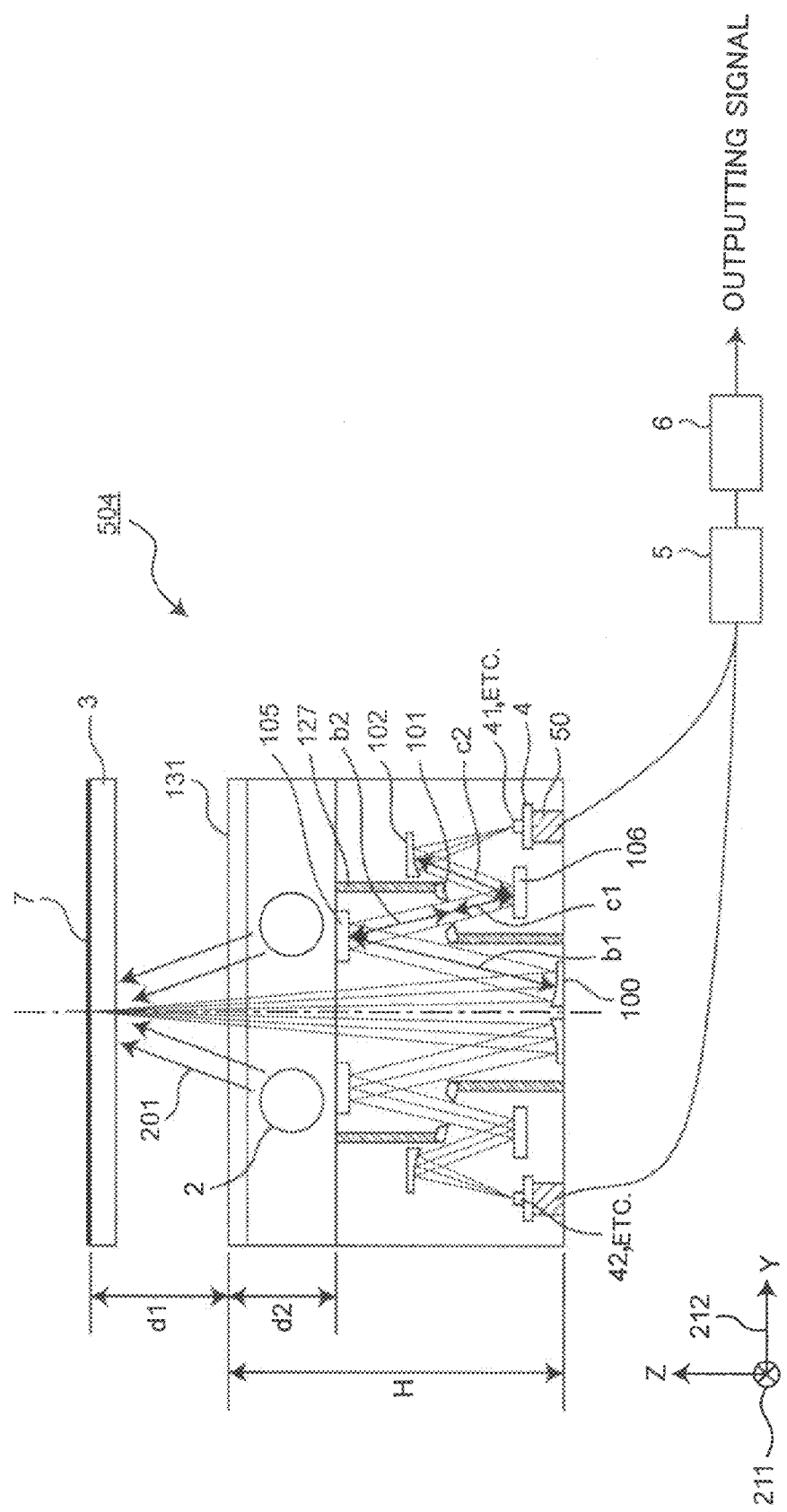
FIG. 27 is a cross-sectional view showing the structure of an image reading apparatus according to a fourth embodiment of the present invention.

Further, in the image reading apparatus 503, similarly to the image reading apparatus 502, as shown in FIG. 19, the optical axes 11a, 12a, 13a, . . . , directed from the document 7 to the cells 11, 12, 13, . . . , slightly tilt in the sub-scanning direction 212, and the optical axes 11a, 12a, 13a, . . . , intersect one another between those in the first row 215 arranged on the right half side and the second row 216 arranged on the left half side in FIG. 27. It goes without saying that, the structure of the third embodiment can be adopted in a structure where the optical axes 11a, 12a, 13a, . . . , do not intersect one another between those in the first row 215 and those in the second row 216 and are in parallel to one another, similarly to the structure described in the first embodiment. However, such parallel case will not be described herein.

In the following, a detailed description will be given of the difference noted above.

FIG. 25 is a diagram showing a cross section taken along the sub-scanning direction 212 in the image reading apparatus 503, in which optical paths in the cells 11, 12 and the like from the document 7 to the image pickup device units 41, 42 and the like described in FIG. 5 are shown in an actual manner. Here, each first lens 100 and each second lens 102 correspond to exemplary elements functioning as the first reflective light-gathering optical element and the second reflective light-gathering optical element, respectively, each being a concave mirror that reflects the light. Further, similarly to the structures in the first and second embodiments, the aperture 101 is arranged in the optical paths from the first lens 100 to the second lens 102. Furthermore, in the image reading apparatus 503, the first plane mirror 105 as an optical element is arranged in the optical paths between the first lens 100 and the aperture 101. Hence, as will be described later, the light having reflected from the first lens 100 is reflected by the first plane mirror 105, passes through the aperture 101, and arrives at the second lens 102.

FIG. 26 is a perspective view of optical paths in an actual manner, in a state where the cells 11, 13, . . . , belonging to the first row 215 and the cells 12, 14, . . . , belonging to the second row 216 are arranged zigzag in the main scanning direction 211. It is to be noted that, in order to avoid complication in FIG. 26, the light sources 2, the partition walls 127, and the top panel 3 are not shown.

In the image reading apparatus 503 according to the third embodiment, as shown in FIG. 25, the top panel 3 on which the document 7 is placed and an incident window 131 of the image reading apparatus 503 are separated from each other. Herein, what is assumed is, e.g., an apparatus in which document information is read by the image reading apparatus 503 scanning in the sub-scanning direction 212, in a state where the top panel 3 is stable. In order to avoid contact between the top panel 3 and the image reading apparatus 503 in scanning, a gap d1 is provided between the top panel 3 and the incident window 131.

A description will be given of a reading operation of the document 7 with the image reading apparatus 503 structured as described above.

In FIG. 25, the document 7 placed on the top panel 3 is illuminated by the illumination light sources 2, and reflected scattered light from the document 7 becomes incident upon the optics system of the image reading apparatus 503. The first lenses 100 and 100 arranged below the top panel 3 in the Z-direction so as to respectively correspond to the first row 215 and the second row 216 reflect off diagonally upward the light beams respectively reflected from the reading lines 8 and 9 in directions being different from each other in the sub-scanning direction 212 by an angle φ. It is to be noted that the angle φ is an angle formed by an optical axis 591 of the light beam directed from each of the reading lines 8 and 9 to the first lenses 100 and 100, and an optical axis 592 of the light beam reflected from each of the first lenses 100 and 100.

The light beams reflected diagonally upward by the first lenses 100 and 100 are reflected downward by the first plane mirrors 105 in the Z-direction, pass through the apertures 101 and 101, and arrive at the second lenses 102 and 102. Here, the apertures 101 and 101 are arranged at the back focal point position of the first lenses 100 and 100. The light beams again reflected upward by the second lenses 102 and 102 in the Z-direction arrive at the image pickup device units 41, 43, . . . , corresponding to the cells 11, 13, . . . , and the image pickup device units 42, 44, . . . , corresponding to the cells 12, 14, . . . , respectively.

Here, the second lenses 102 and 102 and the image pickup device units 41, 42, . . . , in the first row 215 and the second row 216, respectively, are shielded from the light sources 2 by the partition walls 127 and the apertures 101. Since the structure and function of the substrate 4 are the same as described in the first embodiment, the description will not be repeated herein.

Figure 30:
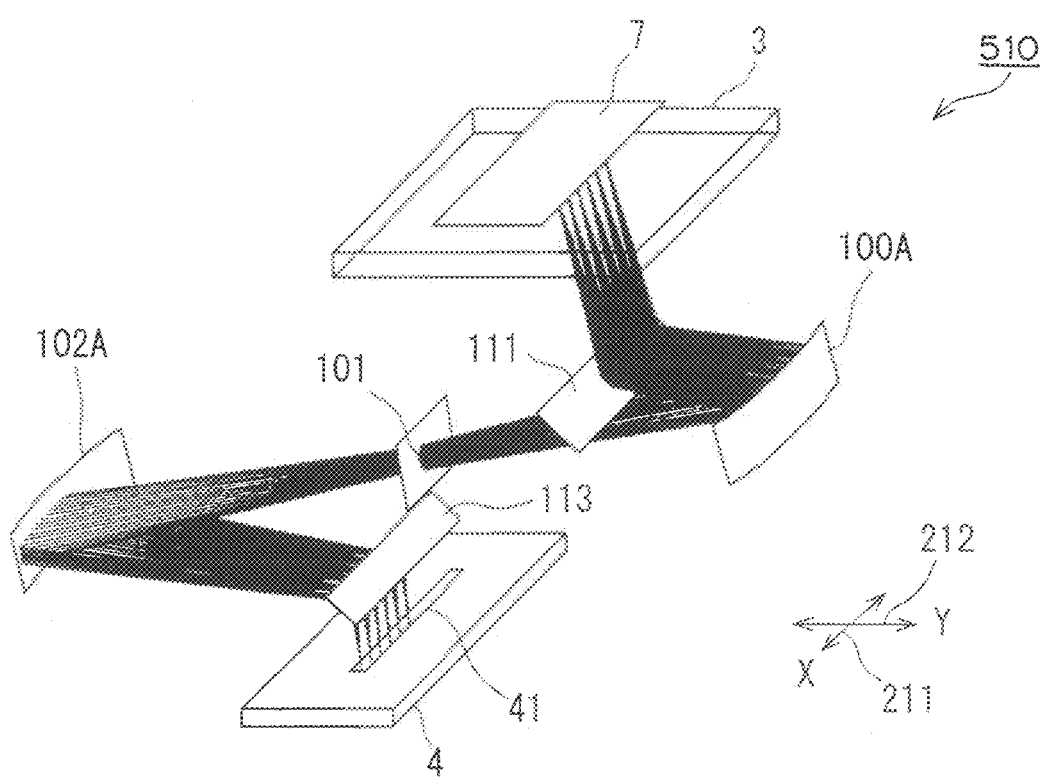
FIG. 30 is a perspective view showing one example of the structure of a conventional image reading apparatus.

Further, in the image reading apparatus 503, the oblique incident angle of the light beams at the first lenses 100 each being a concave mirror, the oblique incident angle of the light beams at the first plane mirrors 105 each being a plane mirror, and an oblique incident angle of the light beams at the second lenses 102 each being a concave mirror, are each approximately 10 degrees or less, which is far smaller than 45 degrees of the oblique incident angle at the bending mirrors 111 and 113 shown in FIG. 30 as the conventional technique. Hence, the rotation angle of the image attributed to the first lenses 100, the first plane mirrors 105, and the second lenses 102 is small.

Accordingly, with the image reading apparatus 503 according to the third embodiment also, provision of the first lenses 100, the first plane mirrors 105, and the second lenses 102 at which each incident angle of the light beams is relatively small can avoid the problem of occurrence of distortion in the image attributed to any manufacturing error and installation error of the mirrors, similarly to the image reading apparatuses 501 and 502 according to the first and second embodiments.

Further, with the image reading apparatus 503 according to the third embodiment, since the optical paths are bent by the first plane mirrors 105, the following two advantages can be obtained.

That is: (1) the gap d1 between the top panel 3 and the incident window 131 can be set to be great, which allows the optics system portion of the image reading apparatus 503 to physically scan; and (2) the height "H" (FIG. 25) of the image reading apparatus 503 in the Z-direction can be reduced.

The aforementioned (1) will be described. The focal point position at the side of the document of the optics system in the image reading apparatus is positioned on each of the reading lines 8 and 9 of the document 7 and, in the image reading apparatuses 501 and 502 according to the first and second embodiments, in connection with the relationship with the focal point distance, the second lenses 102 are arranged immediately below the top panel 3 on which the document 7 is placed, for example as shown in FIG. 1. Hence, with the image reading apparatuses 501 and 502, it is difficult to set the focal point position in the side of the document upward away from the optics system portion (corresponding to "H" portion in FIG. 25) of the image reading apparatus; in other words, it is difficult to design so as to arrange the optics system portion and the top panel 3 to be away from each other to some extent.

In contrast, with the image reading apparatus 503 according to the third embodiment, adoption of the structure in which the first plane mirrors 105 are provided between the first lenses 100 and the second lenses 102 so as to bend the optical paths realizes provision of a great space between the focal point position at the side of the document and the first plane mirror 105. Thus, by arranging the illumination light sources 2 and the incident window 131 above the first plane mirrors 105, it becomes possible to widen the distance between the incident window 131 and the focal point position at the document side. That is, the gap d1 between the top panel 3 and the incident window 131 can greatly be widened, which enables the optics system portion of the image reading apparatus 503 to physically scan while avoiding contact between the top panel 3 and the optics system portion of the image reading apparatus 503.

Next, the aforementioned (2) will be described. The height "H" of the image reading apparatus 503 shown in FIG. 25 is approximately represented by the following formula.

$$H \approx b1 + d2 \quad \text{(formula 4)}$$

where d2: the space required for the illumination (light source 2) system; and b1: the distance from each first lens 100 to each first plane mirror 105.

Further, for the description that will follow, the following variables are defined.

b2: the distance from each first plane mirror 105 to each aperture 101; and L3: the distance from each aperture 101 to each second lens 102.

On the other hand, the height (represented by H') in the image reading apparatus 501 shown in FIG. 1 is represented by the following formula.

$$H' \approx L1 + L2 + L3 + d2 \quad \text{(formula 5)}$$

Here, as has already been described in the first embodiment, L1 to L3 are defined as follows. L1 is the distance from the surface of the document 7 to the surface of each first lens 100; L2 is the distance from the surface of each first lens 100 to each aperture 101; and L3 is the distance from each aperture 101 to the surface of each second lens 102. Further, d2 is the space required for the light source 2 system in the image reading apparatus 501.

Since the image reading apparatuses according to the embodiments are each telecentric at the side of the document, the following relationships are established using the focal point distance f1 of the first lens 100.

$$f1 = b1 + b2 \quad \text{(formula 6)}$$

$$f1 = L2 \quad \text{(formula 7)}$$

Hence, the formulas 4 and 5 can be rewritten as follows.

$$H = f1 + d2 - b2 \quad \text{(formula 8)}$$

$$H' = f1 + d2 + L3 \quad \text{(formula 9)}$$

As can clearly be seen from the formulas 8 and 9, the height H is smaller than the height H' by (L3+b2). That is, bending the optical paths by the first plane mirror 105 provides a great advantage of a reduction in the height by the distance L3 from each aperture 101 to each second lens 102 and the distance b2 from each first plane mirror 105 to each aperture 101.

As shown in FIG. 25, in the image reading apparatus 503 according to the third embodiment, since the arrangement position in the Z-direction of the first lenses 100 and that of the second lenses 102 are substantially at the same level, the height H of the image reading apparatus 503 can be represented by the formula 4. On the other hand, when the second lenses 102 are at a level lower than the first lenses 100, the height H is represented by the following formula.

$$H \approx b2 + L3 \quad \text{(formula 10)}$$

Though it depends on the design, in this case also, generally, insertion of the first plane mirrors 105 realizes a reduction in the height H to be lower than that in the image reading apparatus 501 shown in FIG. 1. Further, a reduction in the transfer magnification of the cell 11 and the like realizes a reduction in the distance L3 from each aperture 101 to each second lens 102, and hence a reduction in the height H of the product. That is, while the advantage of the transfer magnification of the cells being at the same rate has been described in the first embodiment, the third embodiment is advantageous in the transfer magnification being reduced.

Figure 29:
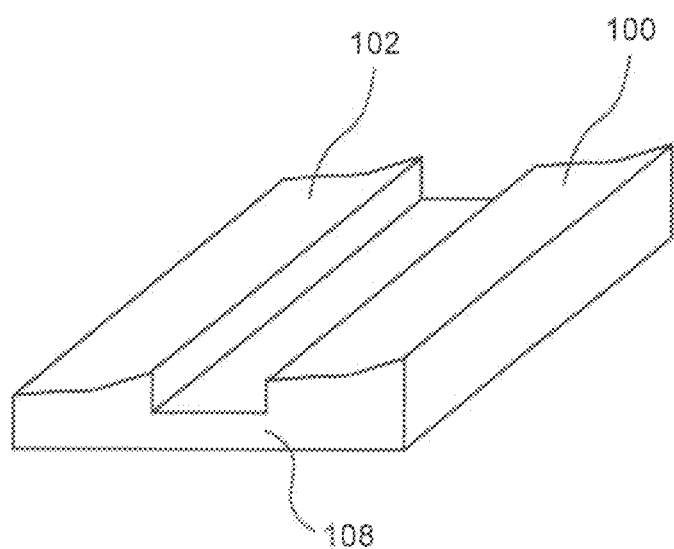
FIG. 29 is a perspective view showing an exemplary structure of a first lens and a second lens in the image reading apparatus shown in FIG. 25.

Further, with the image reading apparatus 503 according to the third embodiment, as shown in FIG. 25, since the position of the first lens 100 and that of the second lens 102 are close to each other in the sub-scanning direction 212, it is possible to integrally mold the first lens 100 and the second lens 102 with resin as shown by a member 108 in the perspective view of FIG. 29. Such integral resin molding provides great advantages of a reduction in the number of components and easier assembly.

Fourth Embodiment

FIG. 27 shows an image reading apparatus 504 according to a fourth embodiment. The image reading apparatus 504 corresponds to a variation of the image reading apparatus 503 according to the third embodiment. Similarly to the image reading apparatus 503, it is structured to include the first plane mirror 105 between each first lens 100 and each aperture 101, and further includes the following structure. In the following, a description will be given solely of the difference from the image reading apparatus 503 according to the third embodiment.

That is, the image reading apparatus 504 has a structure in which, in addition to the first plane mirrors 105, a second plane mirror 106 is provided in the optical paths between each aperture 101 and each of second lens 102. Each second plane mirror 106 further bends the optical paths. It is to be noted that, c1 shown in FIG. 27 denotes the distance from each aperture 101 to each second plane mirror 106, and c2 denotes the distance from each second plane mirror 106 to each second lens 102.

The image reading apparatus 504 according to the fourth embodiment structured in this manner exhibits the following effects. That is, as has been described in the third embodiment, in the case where the second lenses 102 are positioned at a level lower than the first lenses 100 in the Z-direction, the height H is represented by the formula 10, and the reduction amount is small. On the other hand, as in the fourth embodiment, provision of the second plane mirrors 106 to further bend the optical paths is greatly advantageous in that the height H of the apparatus can be represented by the formula 4, and that a further reduction can be achieved.

Fifth Embodiment

Figure 28:
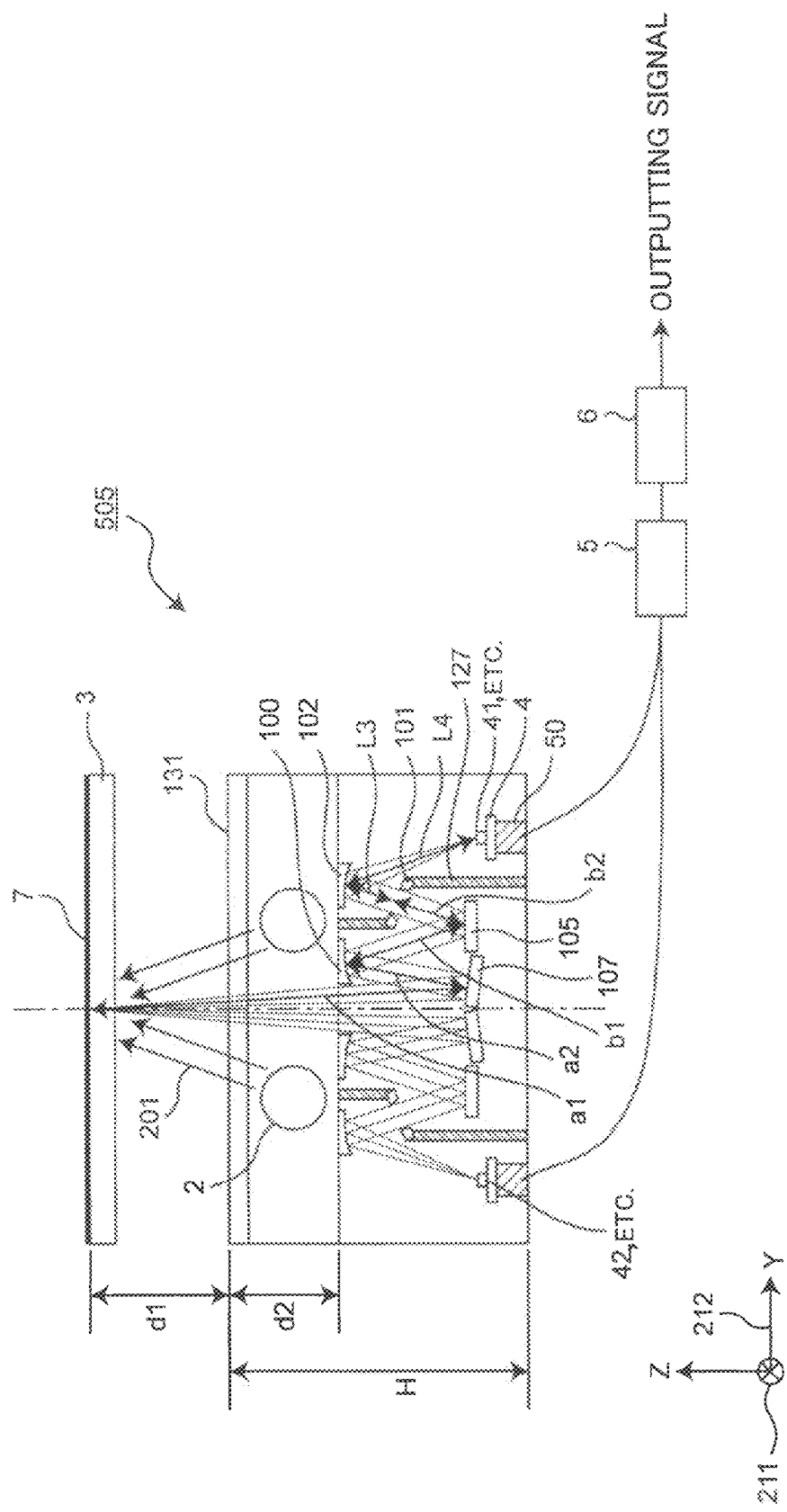
FIG. 28 is a cross-sectional view showing the structure of an image reading apparatus according to a fifth embodiment of the present invention.

FIG. 28 shows an image reading apparatus 505 according to a fifth embodiment. The image reading apparatus 505 corresponds to a variation of the image reading apparatus 503 according to the third embodiment. Similarly to the image reading apparatus 503, the first plane mirror 105 is provided in the optical paths between each first lens 100 and each aperture 101, and further includes the following structure. In the following, a description will be given solely of the difference from the image reading apparatus 503 according to the third embodiment.

In the image reading apparatuses 503 and 504 according to the third and fourth embodiments, though the first plane mirrors 105 are provided, as shown in FIGS. 25 and 27, the light having reflected from the document 7 is directly reflected on the first lenses 100. In contrast, the image reading apparatus 505 according to the fifth embodiment is structured such that, as shown in FIG. 28, a third plane mirror 107 is provided in the optical paths between the document 7 and each first lens 100 to bend the optical paths of the reflected light from the document 7 to the first lens 100. It is to be noted that, a1 shown in FIG. 28 denotes the distance from the focal point position at the side of the document to the third plane mirror 107, and a2 denotes the distance from the third plane mirror 107 to the first lens 100.

The height H of the image reading apparatus 505 is represented by the following formula.

$$H \approx d2 + MAX(a2, b1, L4) \quad \text{(formula 11)}$$

where MAX ( ) represents the function that takes the maximum value out of the numerals listed in the parentheses.

The image reading apparatus 505 according to the fifth embodiment structured is advantageous in that, provision of the third plane mirrors 107 shortens L1 shown in FIG. 1, and provision of the first plane mirrors 105 reduces the height H represented by the formula 11 to be smaller than the height H' of the image reading apparatus 501 shown in FIG. 1 represented by the formula 5.

In the image reading apparatus 505 according to the fifth embodiment, as described above, the third plane mirrors 107 are provided between the document 7 and the first lenses 100. However, as has been described in the third embodiment, the oblique incident angle of the light beams at the third plane mirrors 107 each being a plane mirror, and the oblique incident angle of the light beams at the first lenses 100 each being a concave mirror, are each approximately 10 degrees or less, which is far smaller than 45 degrees of the conventional technique. Hence, the rotation angle of the image attributed to the third plane mirrors 107 and the first lenses 100 is small. Accordingly, the problem of occurrence of distortion in the image attributed to any manufacturing error and installation error of the mirrors can be avoided.

Further, as can clearly be seen from FIG. 28, in the image reading apparatus 505, each first lens 100 and each second lens 102 are positioned adjacent to each other. Hence, the first lens 100 and the second lens 102 can integrally be formed with resin. Such integral resin molding provides great advantages of a reduction in the number of components and easier assembly.

Similarly, since each first plane mirror 105 and each third plane mirror 107 are also positioned adjacent to each other, they can be formed as an integrated member. Further, in FIG. 28, though the reflective portions of each first plane mirror 105 and that of each third plane mirror 107 are shown as planes being tilted with reference to each other, the reflective portions of the first plane mirror 105 and that of the third plane mirror 107 can easily lie in the same plane, depending on the design. In this case, the first plane mirror 105 and the third plane mirror 107 can be structured with one plane mirror, whereby great advantages of a reduction in the number of components and easier assembly can be obtained. It is to be noted that, such members of the plane mirrors may be manufactured through resin molding, or may be made using a glass plate or the like.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2011-277805 filed on Dec. 20, 2011, including specification, claims, drawings, and summary are incorporated herein by reference in its entirety.

Description Of Symbols

1 IMAGING OPTICS SYSTEM
2 ILLUMINATION LIGHT SOURCE
3 TOP PANEL
4 SUBSTRATE
5 MEMORY
6 PROCESSOR
7 DOCUMENT
8, 9 READING LINE
11, 12, 13, 14, . . . CELL
31, 32, 33, 34, . . . SECTION TO BE IMAGED
41, 42, 43, 44, . . . IMAGE PICKUP DEVICE UNIT
50 ELECTRONIC CIRCUIT COMPONENT
100 FIRST LENS
101 APERTURE
102 SECOND LENS
105 FIRST PLANE MIRROR
106 SECOND PLANE MIRROR
107 THIRD PLANE MIRROR
126 LIGHT SHIELDING MEMBER
127 PARTITION WALL
202 STRAY LIGHT BEAM
203 DASHED LINE REGION
211 MAIN SCANNING DIRECTION
212 SUB-SCANNING DIRECTION
215 FIRST ROW
216 SECOND ROW
501 to 505, 510 IMAGE READING APPARATUS

What is claimed is:

1. An image reading apparatus, comprising:
a light source configured to apply light to a document;
an imaging optics system configured to condense light which is the light from the light source and reflected on the document to form an image, the imaging optics system including a plurality of cells each of which is an independent optics system, a plurality of the cells being arranged in a main scanning direction, and being arranged to form two rows of a first row and a second row in a sub-scanning direction being perpendicular to the main scanning direction, the cells arranged in an identical one of the rows being arranged such that light beams directed from the document to the cells out of chief rays are in parallel to one another, and the cells of the first row and the cells of the second row being arranged zigzag in the main scanning direction;

a plurality of image pickup device units configured to be arranged so as to correspond to the cells, respectively, and configured to receive the light having passed through the cells;

a memory configured to store image information pieces of the document that are respectively sent out from corresponding ones of the image pickup device units in the sub-scanning direction; and a processor configured to combine image information pieces of adjacent ones of the cells such that images in overlapping areas of the image information pieces stored in the memory match with each other, to create an image of the document, wherein each of the cells has first and second reflective light-gathering optical elements configured to reflect and condense the light from the document, a first plane mirror, and an aperture, wherein the first reflective light-gathering optical element, the first plane mirror, the aperture, and the second reflective light-gathering optical element are arranged in order in a traveling direction of the light from the document to the image pickup device unit in each of the cells, and wherein the aperture is arranged at a back focal point position of the first reflective light-gathering optical element, to form a telecentric optics system at the side of the document.

2. The image reading apparatus according to claim 1, wherein
each of the cells has a third plane mirror, and
the third plane mirror, the first reflective light-gathering optical element, the first plane mirror, the aperture, and the second reflective light-gathering optical element are arranged in order in the traveling direction of the light from the document to the image pickup device unit in each of the cells.

3. The image reading apparatus according to claim 1, wherein
a reflective surface of the first reflective light-gathering optical element and a reflective surface of the second reflective light-gathering optical element are oriented in a substantially identical direction.

4. The image reading apparatus according to claim 1, wherein
the first reflective light-gathering optical element and the second reflective light-gathering optical element are arranged in close proximity to each other.

5. The image reading apparatus according to claim 4, wherein
the first reflective light-gathering optical element and the second reflective light-gathering optical element are integrally molded.

6. The image reading apparatus according to claim 2, wherein
the first plane mirror and the third plane mirror are one plane mirror.

7. The image reading apparatus according to claim 1, wherein
each of the cells has a second plane mirror, and
the first reflective light-gathering optical element, the first plane mirror, the aperture, the second plane mirror, and the second reflective light-gathering optical element are arranged in order in the traveling direction of the light from the document to the image pickup device unit in each of the cells.

8. The image reading apparatus according to claim 7, wherein
a reflective surface of the first reflective light-gathering optical element and a reflective surface of the second plane mirror are oriented in a substantially identical direction.

9. The image reading apparatus according to claim 1, wherein
an incident angle of the chief rays to each of the first reflective light-gathering optical element, the second reflective light-gathering optical element, and the first plane mirror is 30 degrees or less.

10. An image reading apparatus, comprising:
a light source configured to apply light to a document;
an imaging optics system configured to condense light which is the light from the light source and reflected on the document to form an image, the imaging optics system including a plurality of cells each of which is an independent optics system, a plurality of the cells being arranged in a main scanning direction, and being arranged to form two rows of a first row and a second row in a sub-scanning direction being perpendicular to the main scanning direction, the cells arranged in an identical one of the rows being arranged such that light beams directed from the document to the cells out of chief rays are in parallel to one another, and the cells of the first row and the cells of the second row being arranged zigzag in the main scanning direction;

a plurality of image pickup device units configured to be arranged so as to correspond to the cells, respectively, and configured to receive the light having passed through the cells;

a memory configured to store image information pieces of the document that are respectively sent out from corresponding ones of the image pickup device units in the sub-scanning direction; and a processor configured to combine image information pieces of adjacent ones of the cells such that images in overlapping areas of the image information pieces stored in the memory match with each other, to create an image of the document, wherein each of the cells has first and second reflective light-gathering optical elements configured to reflect and condense the light from the document, and an aperture, wherein the first reflective light-gathering optical element, the aperture, and the second reflective light-gathering optical element are arranged in order in a traveling direction of the light from the document to the image pickup device unit in each of the cells, the aperture is arranged at a back focal point position of the first reflective light-gathering optical element, to form a telecentric optics system at the side of the document, and wherein each of the cells only has the first reflective light-gathering optical element and the second reflective light-gathering optical element, as optical elements that reflect an optical path.

11. The image reading apparatus according to claim 10, wherein
an incident angle of the chief rays to each of the first reflective light-gathering optical element and the second reflective light-gathering optical element is 30 degrees or less.

12. The image reading apparatus according to claim 1, wherein
the cells arranged in the first row and the cells arranged in the second row are arranged in a state where the light beams directed from the document to the cells out of the chief rays of the cells arranged in the first row and the light beams directed from the document to the cells out of the chief rays of the cells arranged in the second row are tilted toward a gap between the first row and the second row.

13. The image reading apparatus according to claim 1, further comprising
a plate-like light shielding member configured to be arranged between adjacent ones of the cells in each of the first row and the second row.

14. The image reading apparatus according to claim 1, wherein
one of the first reflective light-gathering optical element and the second reflective light-gathering optical element is a free-form surface in which a light reflective surface is different in curvature between the main scanning direction and the sub-scanning direction.

15. The image reading apparatus according to claim 10, wherein
the cells arranged in the first row and the cells arranged in the second row are arranged in a state where the light beams directed from the document to the cells out of the chief rays of the cells arranged in the first row and the light beams directed from the document to the cells out of the chief rays of the cells arranged in the second row are tilted toward a gap between the first row and the second row.

16. The image reading apparatus according to claim 10, further comprising
a plate-like light shielding member configured to be arranged between adjacent ones of the cells in each of the first row and the second row.

17. The image reading apparatus according to claim 10, wherein
one of the first reflective light-gathering optical element and the second reflective light-gathering optical element is a free-form surface in which a light reflective surface is different in curvature between the main scanning direction and the sub-scanning direction.

* * * * *